(12) United States Patent
Ausserlechner

(10) Patent No.: US 11,598,626 B2
(45) Date of Patent: Mar. 7, 2023

(54) INDUCTIVE ANGLE SENSOR HAVING TWO PICKUP COIL ARRANGEMENTS ARRANGED OFFSET FROM ONE ANOTHER

(71) Applicant: Infineon Technologies AG, Neubiberg (DE)

(72) Inventor: Udo Ausserlechner, Villach (AT)

(73) Assignee: Infineon Technologies AG, Neubiberg (DE)

( * ) Notice: Subject to any disclaimer, the term of this patent is extended or adjusted under 35 U.S.C. 154(b) by 90 days.

(21) Appl. No.: 17/321,888

(22) Filed: May 17, 2021

(65) Prior Publication Data
US 2021/0364272 A1 Nov. 25, 2021

(30) Foreign Application Priority Data
May 20, 2020 (DE) .......................... 102020206396.6

(51) Int. Cl.
*G01B 7/30* (2006.01)
*G01D 5/20* (2006.01)

(52) U.S. Cl.
CPC .............. *G01B 7/30* (2013.01); *G01D 5/2053* (2013.01)

(58) Field of Classification Search
CPC ........ G01D 5/20; G01D 5/204; G01D 5/2053; G01D 5/2073; G01D 5/2086; G01D 5/22; G01D 5/2208; G01D 5/225; G01D 5/2291; G01D 5/2497; G01D 5/2451; G01B 7/30
See application file for complete search history.

(56) References Cited

U.S. PATENT DOCUMENTS

| | | | | |
|---|---|---|---|---|
| 6,236,199 B1 * | 5/2001 | Irie | ...................... | G01D 5/2093 324/207.17 |
| 6,522,128 B1 * | 2/2003 | Ely | ........................ | G01D 5/204 324/207.17 |
| 2014/0132253 A1 * | 5/2014 | Bertin | .................. | G01D 5/2053 324/207.17 |
| 2018/0274947 A1 * | 9/2018 | Maniouloux | .......... | G01B 7/003 |
| 2019/0063954 A1 | 2/2019 | Elliott | | |
| 2022/0155106 A1 * | 5/2022 | Casu | ...................... | G01D 5/204 |
| 2022/0260357 A1 * | 8/2022 | El-Shennawy | ........ | G01D 5/204 |
| 2022/0333955 A1 * | 10/2022 | Levavasseur | .......... | G01D 5/206 |

FOREIGN PATENT DOCUMENTS

| DE | 19738836 A1 | 3/1999 |
|---|---|---|
| DE | 102015220631 A1 | 4/2017 |
| DE | 102018213249 A1 | 2/2020 |

* cited by examiner

*Primary Examiner* — Steven L Yeninas
(74) *Attorney, Agent, or Firm* — Harrity & Harrity, LLP

(57) ABSTRACT

An inductive angle sensor includes an inductive target arrangement with k-fold symmetry and a first pickup coil arrangement with k-fold symmetry and a second pickup coil arrangement with k-fold symmetry. A combination apparatus is designed to combine signals of the first pickup coil arrangement with signals of the second pickup coil arrangement and, on the basis thereof, to ascertain an angle-error-compensated rotation angle. The single pickup coils of the first and second pickup coil arrangements are each rotationally offset about the axis of rotation R by a geometric offset angle α relative to one another. Additionally, the entire first pickup coil arrangement is rotationally offset relative to the entire second pickup coil arrangement about the axis of rotation R by a geometric offset angle ρ.

15 Claims, 15 Drawing Sheets

INDUCTIVE ANGLE SENSOR HAVING TWO PICKUP COIL ARRANGEMENTS ARRANGED OFFSET FROM ONE ANOTHER

FIELD

The present disclosure is related to an inductive angle sensor having integrated compensation for a systematic error band when determining a rotation angle between a stator and a rotor. To this end, the inductive angle sensor has a stator having a first pickup coil arrangement and a substantially identical second pickup coil arrangement, the two pickup coil arrangements being arranged in a manner offset from one another by a defined rotation angle.

BACKGROUND

Inductive angle sensors normally have a stator and a rotor that is rotatable relative thereto. So that the rotor can rotate relative to the stator there is a slight air gap between the rotor and the stator. The stator can be embodied for example as a printed circuit board, PCB for short. There can be a field coil arranged on the stator. The field coil is fed an input signal, for example an AC signal. In response thereto the field coil generates a magnetic field that decouples from the field coil. The rotor opposite has an inductive target that the magnetic field couples into. In response thereto the inductive target produces eddy currents that in turn generate a secondary magnetic field that decouples from the inductive target. The secondary magnetic field then couples into a pickup coil arrangement arranged on the stator. In response thereto the pickup coil arrangement generates an output signal that represents the angle between the stator and the rotor.

The target on the rotor and the pickup coils on the stator are matched to one another. They both have a specific matching symmetry. That is to say that the target and the pickup coils can have a specific symmetrical shape. For example, the target, in a similar manner to an increment wheel, can have a shape comprising teeth and gaps, and the pickup coils can have symmetrical turns, for example. This symmetry is also referred to as a k-fold symmetry within the context of this disclosure. Where this document refers to such a k-fold symmetry, this is understood to mean a form of rotational symmetry. For example, a body has a k-fold symmetry if it can be rotated through 360°*n/k about an axis so that it has the same appearance after rotation as before rotation (n being an arbitrary whole number (integer)). Additionally, a k-fold symmetry is distinguished in the present disclosure in that in the case of a k-fold symmetry the signal induced in a coil (or target) remains identical if the coil (or the target) is rotated through 360°/k.

The aforementioned output signal induced in the pickup coil arrangement can be an AC voltage signal that consists of a radio-frequency RF carrier component and a low-frequency LF signal component. However, it may be that this LF signal component itself does not vary perfectly sinusoidally with the rotation angle between the stator and the rotor. So a systematic error is therefore obtained, or to be more precise a systematic error band, that leads to systematic divergences in the accuracy of the angle measurements. The systematic error is manifested in a low harmonic content of the LF signal component, that is to say in its 2nd, 3rd, 4th, etc, harmonics, with the dominant fundamental wave (=the first harmonic) corresponding to the rotation angle (or, if the target has manifold symmetry k>1, to k times the rotation angle).

One way of correcting this systematic error would be to provide very specific coil geometries in combination with high-precision manufactured targets and precisely known air gaps, so as thereby to obtain a perfectly sinusoidal signal with reference to the angle of rotation. However, this requires complicated coil geometries, leading to rising costs in production.

Another way of correcting this systematic error would be to provide an appropriate mathematical correction formula or an appropriate lookup table, each of which describes the systematic angle error. In this case, such an angle sensor would first be able to calculate the rotation angle, then ascertain the angle difference or the applicable correction factor stored therefor from the formula or table, and subsequently calculate the true rotation angle again by taking into consideration the angle difference or the correction factor. However, this works only for a single, previously defined air gap. As soon as the air gap changes, for example on account of tolerances during assembly, the lookup table or the mathematical correction formula needs to be changed accordingly. It is accordingly necessary to keep a two-dimensional correction table for the angle error for such systems, which correction table is in turn dependent on the true rotation angle and the actual air gap. Furthermore, the air gap always needs to be known very precisely, which is normally not the case, in particular for angle sensors manufactured on a mass-produced basis, however.

It would therefore be desirable to provide an inductive angle sensor that can compensate for or correct a systematic angle error and that nevertheless permits simple coil geometries and reacts to air gap variations without being susceptible to faults and at the same time delivers precise angle signals for targets of substantially arbitrary design.

SUMMARY

An inductive angle sensor having the features of claim 1 is thus proposed. Embodiments and further advantageous aspects of this inductive angle sensor are cited in the respective dependent patent claims.

The innovative inductive angle sensor described herein has, inter alia, a stator and a rotor that is rotatable relative thereto about an axis of rotation, wherein the rotor has an inductive target arrangement with k-fold symmetry, and wherein the stator has a first pickup coil arrangement with k-fold symmetry and a second pickup coil arrangement with k-fold symmetry. The first pickup coil arrangement and the second pickup coil arrangement are each arranged around the axis of rotation R and each have the same number of single pickup coils. The single pickup coils of the first pickup coil arrangement are rotationally offset about the axis of rotation R by a geometric offset angle $\alpha$ relative to one another, and the single pickup coils of the second pickup coil arrangement are rotationally offset about the axis of rotation R by the same geometric offset angle $\alpha$ relative to one another. The offset angle $\alpha$ for a pickup coil arrangement having an even number of single pickup coils is calculated as:

$$\alpha = 360°/k/M/2.$$

The offset angle $\alpha$ for a pickup coil arrangement having an uneven number of single pickup coils is calculated as:

$$\alpha = 360°/k/M.$$

The variable M indicates the number of single pickup coils present per pickup coil arrangement. The angle sensor furthermore has a combination apparatus that is designed to perform a signal combination, wherein signals of the first pickup coil arrangement are combined with signals of the second pickup coil arrangement so as, on the basis thereof, to ascertain an angle-error-compensated rotation angle between the stator and the rotor. Additionally, according to the innovative design described herein, the entire first pickup coil arrangement is rotationally offset about the axis of rotation R by a geometric offset angle ρ relative to the entire second pickup coil arrangement. The first pickup coil arrangement and the second pickup coil arrangement each have the same number of single pickup coils. The first pickup coil arrangement generates a number of signals among which at least two signals have a phase offset of 360°/M on their first harmonic after demodulation. The second pickup coil arrangement generates the same number of signals, at least two signals again having a phase offset of 360°/M on their first harmonic after demodulation here too.

BRIEF DESCRIPTION OF THE DRAWINGS

Some exemplary embodiments are depicted by way of example in the drawing and are explained below. In the drawing.

DETAILED DESCRIPTION

Exemplary embodiments are described in more detail below with reference to the figures, wherein elements having the same or a similar function are provided with the same reference signs.

Where this description refers to a k-fold symmetry, this is understood to mean a form of rotational symmetry. A body has a k-fold symmetry if it can be rotated through $360°*n/k$ about an axis so that it has the same appearance after rotation as before rotation (n being an arbitrary whole number (integer)). Additionally, a k-fold symmetry is distinguished in the present disclosure in that in the case of a k-fold symmetry the signal induced in a coil (or target) remains identical if the coil (or the target) is rotated through 360°/k.

Where this description cites absolute values for angles, these absolute values also apply in a tolerance range of ±10% or of ±1°. That is to say that the innovative design described herein can still deliver satisfactory results even in the case of divergences in angles cited herein in a range of ±10% or of ±1°.

Figure 7:
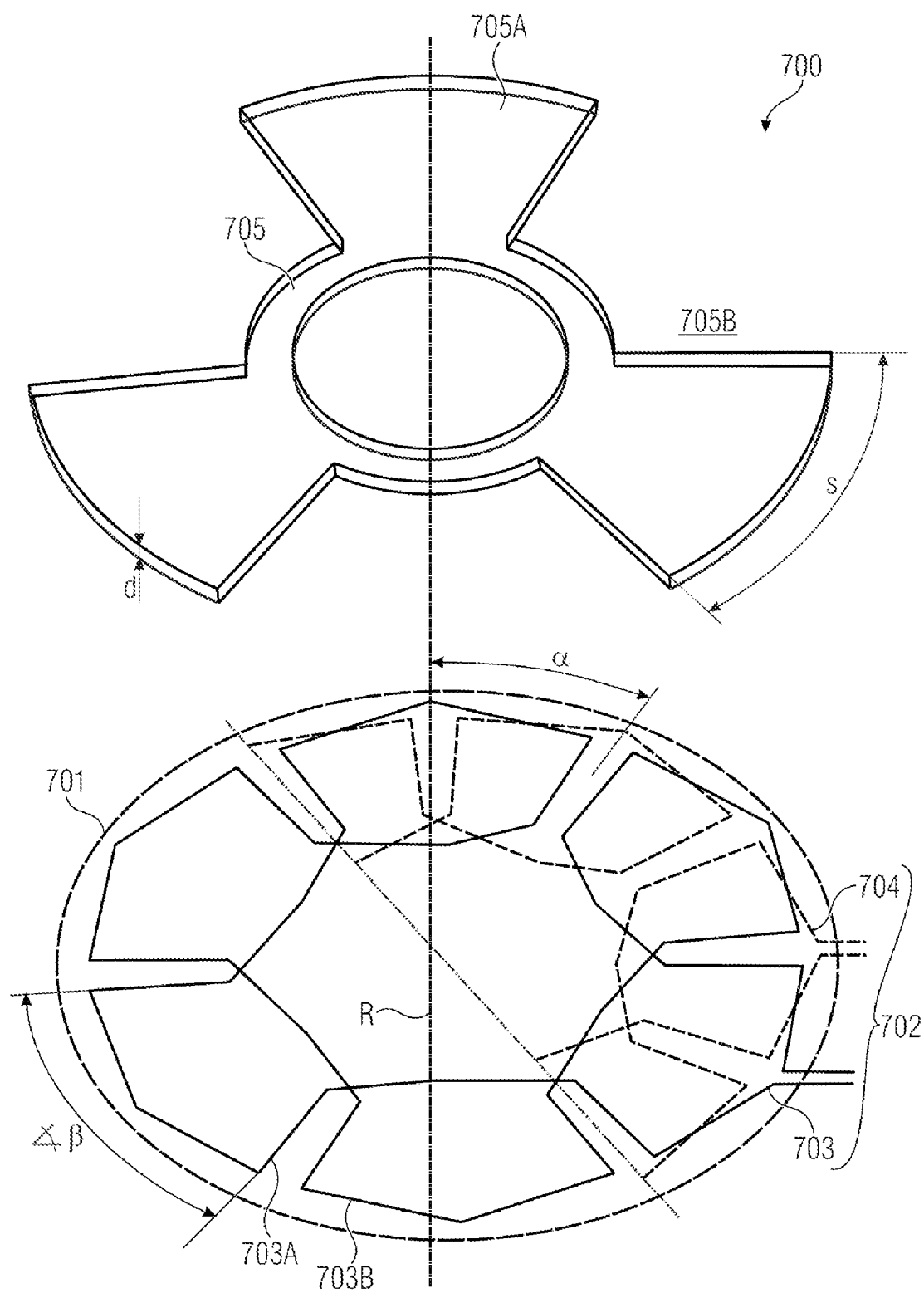
FIG. 7 shows a schematic view of an inductive angle sensor having astatic pickup coils.

There will first be a discussion of an inductive angle sensor having an individual pickup coil arrangement by way of introduction to the problems faced here. FIG. 7 shows a schematic view of an inductive angle sensor 700 of this kind.

The angle sensor 700 has a field coil 701 and an individual pickup coil arrangement 702 having two single pickup coils 703, 704 offset from one another. The field coil 701 and the pickup coil arrangement 702 are typically arranged on a stator (not depicted explicitly here). The angle sensor 700 furthermore has an inductive target 705. The target 705 is typically arranged on a rotor (not depicted explicitly here).

The target 705 can be manufactured from an electrically conductive material and produced for example as a punched-out metal molding having a thickness d. Instead of a solid metal molding the target can also be produced in the form of rotor coils. In this case the rotor coils could have substantially the geometric shape of the metal molding and be operated as shorted coils.

The target 705 can have a k-fold symmetry. In this example the target 705 has a 3-fold symmetry with three teeth 705A and three gaps 705B in each case. The gaps 705B between the teeth 705A do not necessarily have to have the same shape as the teeth 705A themselves. The teeth 705A have a span s on the outer radius.

The single pickup coils 703, 704 on the stator can be adapted for the inductive target 705 on the rotor. That is to say that the single pickup coils 703, 704 can have a k-fold symmetry that matches the k-fold symmetry of the target 705. In this example the two single pickup coils 703, 704 each have a 3-fold symmetry, two juxtaposed turns 703A, 703B belonging with one single pickup coil 703. Two juxtaposed turns 703A, 703B have an opposite orientation sense, i.e. they are each wound in opposite directions, in order to compensate for homogeneous external magnetic fields (interference fields) and symmetrical interference fields of the field coil 701. These single pickup coils 703, 704 are therefore also referred to as astatic.

Astatic pickup coils are distinguished inter alia in that they have an even number of turns, the even-numbered turns being wound in a first winding direction (e.g clockwise) and the respective uneven-numbered turns in between being wound in an opposite, second winding direction (e.g counterclockwise). Given homogeneous interference magnetic fields this now leads to the first half of an astatic single pickup coil delivering a first signal and the second half of this astatic single pickup coil delivering a second signal, wherein the second signal is inverted in relation to the first signal on account of the counterclockwise winding direction. The same applies in this example to the second astatic single pickup coil depicted here, the first half of which delivers a third signal in this example and the second half of which delivers a fourth signal inverted with respect thereto on account of the counterclockwise winding direction. This inverted arrangement means that induced signals that can be attributed to spatially constant interference fields cancel one another out.

In reference to the important definition of k-fold symmetry in this disclosure, the following will also be pointed out at this juncture. As mentioned at the outset, each of the single pickup coils 703, 704 shown in FIG. 7 has a 3-fold symmetry in each case. The 3-fold symmetry will be explained below by way of illustration using an individual single pickup coil, for example using the single pickup coil 703. The reason is that if the single pickup coil 703 depicted here were to be rotated through 360°/6=60°, then although the respective conductor loops or turns thereof would be congruent again, the orientation sense (winding direction) of each single loop or single turn would be opposite in this case. The single pickup coil 703 thus needs to be rotated through 360°/3=120° so that the single turns would be congruent again and also have the same orientation sense, which means that the single pickup coil 703 accordingly also delivers the same signal again. So the two single pickup coils 703, 704 depicted therefore have a 3-fold symmetry (i.e. k=3), even though at first glance they appear as though they have a 6-fold symmetry (i.e. k=6).

Each of the single pickup coils 703, 704 generates an appropriate output signal in response to the secondary magnetic field emanating from the target 705. These can be output voltage signals. These radio-frequency output signals are amplitude-modulated and vary with the present rotation position of the rotor relative to the stator. These amplitude-modulated RF signals can be demodulated. The demodulated LF signals of the two astatic single pickup coils 703, 704 are at least approximately sinusoidal or cosinusoidal, likewise again depending on the angle of rotation of the rotor relative to the stator. The astatic single pickup coils 703, 704 are therefore occasionally also referred to as sine pickup coil and cosine pickup coil. Sine and cosine are naturally arbitrarily interchangeable in this example.

The first and second single pickup coils 703, 704 are furthermore arranged in a manner offset from one another by a geometric offset angle α. This offset angle α is dependent on the variable k of the k-fold symmetry of the single pickup coils 703, 704 and on the variable M. The variable M indicates the number of single pickup coils 703, 704 that a pickup coil arrangement 702 has. In principle, each of the single pickup coils 703, 704 can generate a respective induced output signal. The output signals have a phase offset that is obtained inter alia based on the offset angle α. So the variable M therefore also characterizes the number of induced output signals generable per pickup coil arrangement. This will also be discussed in more detail below.

The turns 703A, 703B of a respective single pickup coil 703 can additionally have a turn angle ß.

The field coil 701 and the single pickup coils 703, 704 are arranged rotationally symmetrically around a common axis of rotation R. The field coil 701 is arranged annularly around the single pickup coils 703, 704 in this instance.

It should be stated once again at this juncture that the inductive angle sensor 700 depicted here thus has a pickup coil arrangement 702 having multiple (here two) single pickup coils 703, 704 that are rotated in relation to one another around the axis of rotation R by a geometric offset angle α. Each single pickup coil 703, 704 has multiple turns 703A, 703B.

To operate the inductive angle sensor 700 the field coil 701 can have for example a sinusoidal voltage of approximately 1 V applied to it at a frequency of 4 MHz. This generates a magnetic alternating field (primary magnetic field) in the field coil 701, which field in turn produces eddy currents in the target 705. These eddy currents for their part in turn generate a magnetic field (secondary magnetic field) that couples into the single pickup coils 703, 704 and generates corresponding electrical voltages therein. The voltages of the respective single pickup coils 703, 704 are measured. Since the voltage values are dependent on the position of the rotor relative to the stator, this can serve as a measure of the rotation angle between the rotor and the stator. These are amplitude-modulated signals, i.e. they have a carrier frequency of 4 MHz in this case, but the amplitude thereof varies with the position of the rotor relative to the stator.

Figure 8:
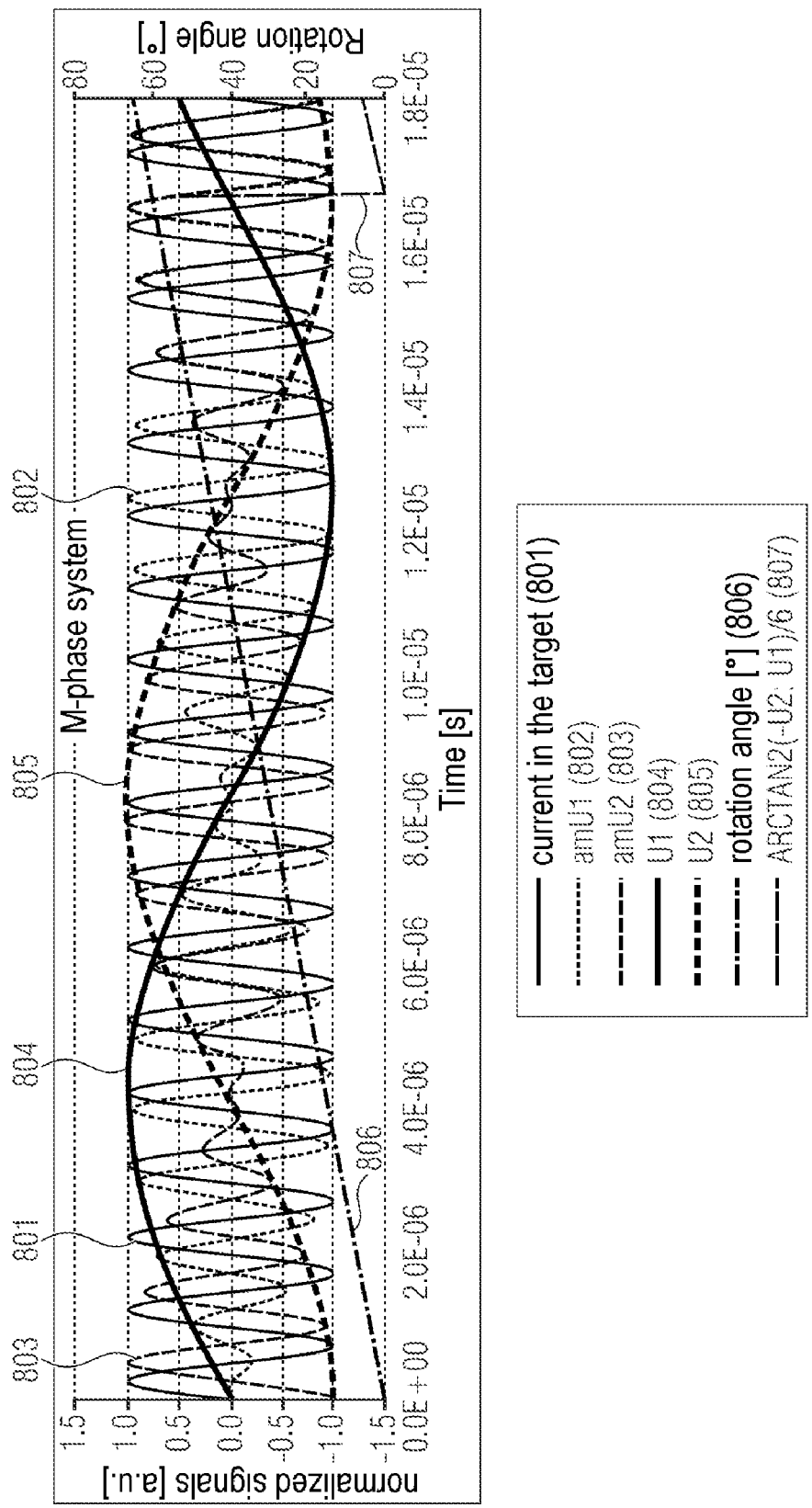
FIG. 8 shows a graphical representation of the temporal signal characteristic of an M-phase system of astatic coils with a quickly rotating target.

This will be explained in more detail below with reference to FIG. 8. FIG. 8 shows an exemplary plot of signals of a pickup coil arrangement having an even number of single pickup coils (here: M=2), or of signals of an M-phase system having even-numbered M (here: M=2), specifically in the time domain with 6-fold symmetry, i.e. k=6. This is thus not a pickup coil arrangement as shown in FIG. 7, because the pickup coil arrangement 702 shown in FIG. 7 has, for the sake of better clarity, a 3-fold symmetry, i.e. k=3. Nevertheless, reference will occasionally be made to the apparatus from FIG. 7 and to the reference signs thereof for parallels in the description that follows for the signals depicted in FIG. 8.

As can be seen in FIG. 8, time is plotted on the abscissa, in the example here between 0 μs and 18 μs. The curve 801 represents the eddy current in the target 705 that is produced by the magnetic field of the field coil 701. The curve 801 oscillates at 1 MHz and has a constant amplitude. Additionally, the curve 801 is free of mean values. In this example it will be assumed that the rotor rotates at a velocity of 360°/100 μs, corresponding to a very high velocity of rotation of 6*10^5 revolutions per minute (merely in order to illustrate the signals in the plot).

The signals amU1 (curve 802) and amU2 (curve 803) represent the voltages that are induced in the two single pickup coils 703, 704. The voltages amU1, amU2 are amplitude-modulated signals that are substantially free of mean values. After demodulation of the respective amplitude-modulated signals amU1, amU2, for example by means of a phase-coherent demodulator, the respective envelope (i.e. the "upper" sections of the amplitude-modulated signals amU1, amU2) of these signals amU1, amU2 is obtained. The envelope of the signal amU1 is denoted by U1 in this instance, and the envelope of the signal amU2 is denoted by U2 in this instance. That is to say that the radio-frequency amplitude-modulated RF signals amU1, amU2 are obtained before the demodulation and the low-frequency LF signals U1, U2 are obtained after the demodulation. Since the LF signals U1, U2, as mentioned at the outset, are free of mean values, they are already robust in the face of stray fields, i.e. astatic, and there is therefore no need for further signal modification, e.g. by subtracting signal components.

As can be seen in FIG. 8, the demodulated LF signals U1, U2 are at least approximately sinusoidal and cosinusoidal, depending on the angle of rotation of the rotor relative to the stator. However, it will be clarified that the LF signals U1, U2 have small divergences from the perfect sinusoidal characteristic that lead to systematic angle errors in the prior art, and that are eliminated to the greatest possible extent by the innovative design described herein.

The two envelopes, i.e. the demodulated LF signals U1, U2, can be generated by means of a phase-synchronous demodulator, for example. The LF signals U1, U2 can then be related to the position of the rotor in relation to the stator, as a result of which the rotor position is determinable based on the demodulated LF signals U1, U2. This can be achieved by calculating the arctangent of the two LF signals U1, U2 phase-shifted with respect to one another. The result obtained from the arctangent calculation is the straight line 807. This represents the electrical rotation angle depicted here, which is represented by the curve 806.

The amplitude-modulated RF signals amU1 (curve 802) and amU2 (curve 803) depicted in FIG. 8 can thus be voltages that are generated in the two single pickup coils 703, 704 with 6-fold symmetry (k=6), which are rotated through the offset angle α in relation to one another. The rotation through the offset angle α means that the two demodulated LF signals U1 (curve 804) and U2 (curve 805) have a 90° phase offset in relation to one another in what is known as the electrical angle domain.

It will be noted at this juncture that two different phase offsets are shown in FIG. 8. First, the amplitude-modulated RF signals amU1, amU2 (see curves 802, 803) involve a temporal phase offset. On the other hand, the baseband signals, i.e. the demodulated LF signals U1, U2 (see curves 804, 805), involve a phase offset in reference to the rotation angle. The signals accordingly thus change both over time and over rotation angle between the stator and the rotor. When this disclosure refers to a phase offset, this means the phase offset in reference to the rotation angle, unless indicated otherwise.

The two signals shown in FIG. 8 come from a 2-phase system (M=2). The two signals depicted (i.e. two amplitude-modulated RF signals 802, 803 or two demodulated LF signals 804, 805) indicate that this 2-phase system has two single pickup coils. These can be astatic single pickup coils, as depicted by way of illustration in FIG. 7.

As mentioned at the outset, the variable M indicates the number of single pickup coils present per pickup coil arrangement. When M is even-numbered an exception can apply. This will be explained briefly below using a theoretical example with reference to the apparatus depicted in FIG. 7.

As such, in the example depicted in FIG. 7, two additional single pickup coils 703x, 704x could also be added, in which case the first additional single pickup coil 703x would be rotated through 60° in relation to the first single pickup coil 703 and the second additional single pickup coil 704x would be rotated through 60° in relation to the second single pickup coil 704. However, a turn of the first single pickup coil 703 that is wound clockwise would then come to rest directly opposite a turn of the first additional single pickup coil 703x that is wound counterclockwise, i.e. the first additional single pickup coil 703x would generate a signal that would differ from the signal generated by the first single pickup coil 703 only in arithmetic sign. This would therefore bring no new angle information, and the additional single pickup coil 703x can therefore be dispensed with. This applies to all even-numbered M. So when M is even-numbered, it is therefore possible to manage with M/2 single pickup coils, for the reasons just mentioned. Purely mathematically, two coils of different phase are also sufficient. That is to say that if a pickup coil arrangement should have an even number of single pickup coils, with the first half (M/2) of the single pickup coils generating first output signals and the second half (M/2) of the single pickup coils generating inverted second signals, then one half (i.e. M/2) of the M single pickup coils is sufficient to implement the innovative design described herein. The other half (M/2) of the single pickup coils present would be "redundant", on the other hand. A special case of "redundant" single pickup coils such as this is therefore included herein for the purposes of the present application, i.e. only half of the single pickup coils present are counted in such a case. Specifically, this means that the variable M is replaced by M/2 in the formulae described herein.

It thus remains to be stated both that the example depicted in FIG. 7 is a 2-phase system, i.e. M=2, and that the signals depicted in FIG. 8 were likewise generated by a 2-phase system. Since the two 2-phase systems have a different k-fold symmetry (FIG. 7: 3-fold symmetry; FIG. 8: 6-fold symmetry), however, the periodicity of the signals from FIG. 8 differs from the periodicity of the signals that can be generated by means of an apparatus from FIG. 7.

This in turn is due to the fact that the periodicity is related to the variable k of the k-fold symmetry. The reason is that the signals shown in FIG. 8 come from a system with 6-fold symmetry, i.e. k=6. As can be seen, a signal period here extends over 60°, which is calculated as 360°/k, with k=6. Accordingly, the depicted signal shape repeats every 60°, i.e. 6 times in total over a full revolution of 360°. The example depicted in FIG. 7, on the other hand, has a threefold symmetry, i.e. k=3. Hence, the signals generated by means of the apparatus shown in FIG. 7 would have a periodicity of 360°/3=120°.

The signal shape depicted in FIG. 8 and discussed relates moreover to the electrical angle domain. The electrical angle domain in turn can be distinguished from the mechanical angle domain. If the rotor rotates through 360° in relation to the stator in reality, i.e. in the mechanical angle domain, then the rotor sweeps over the turns of a single pickup coil with k-fold symmetry k times in total. Such a single pickup coil with k-fold symmetry therefore also accordingly delivers k periods, which would then in turn correspond to the electrical angle domain. That is to say that the electrical angle domain corresponds to k times the mechanical angle domain.

The inductive angle sensor according to the innovative design described herein can output the electrical angle, because if a rotation is produced over e.g. three tooth-gap periods of the target 705 plus a further 7°, the inductive angle sensor outputs 7° and not 3*360°+7° (in particular if the target is rotated while the circuit is deenergized, and the circuit is switched on only at the end). When the present disclosure refers to an angle or rotation angle, this always relates to the electrical angle, unless the mechanical angle is explicitly mentioned.

In the example of a single pickup coil with 6-fold symmetry discussed here with reference to FIG. 8, the electrical angle domain thus corresponds to six times the mechanical angle domain. As is evident from FIG. 8, the RF signals or voltages amU1, amU2 are not always in phase, but this time referenced to the temporal phase offset. They are only in phase when the LF signals U1 and U2 have the same arithmetic sign. Otherwise, they are phase-shifted through 180°. Moreover, according to Faraday's law of induction, they are phase-shifted through 90° in relation to the current in the target.

The electrical rotation angle described in this disclosure thus corresponds to k times the actual mechanical rotation angle. Therefore, only the k-fold part of 360°, that is to say 360°/6=60°, is depicted in FIG. 8. The signals subsequently repeat k times, and hence the electrical rotation angle also repeats k times, i.e. here every 60°. The electrical angle result here is thus not unique with regard to a full revolution through 360° in the mechanical angle domain. There are ways of compensating for this, however, but these are not otherwise the subject of the innovative design described herein.

As was already briefly mentioned before, the innovative design described herein involves the single pickup coils 703, 704 of a pickup coil arrangement 702 being offset from or rotated through a geometric offset angle α in relation to one another. The offset angle α is determined in this instance based on the number k of the k-fold symmetry of the single pickup coils 703, 704 and based on the previously discussed variable M, which indicates the number of single pickup coils of a pickup coil arrangement and the number of signals with a phase offset in relation to one another that are generable by means of the single pickup coils. The example shown in FIG. 7 involves a 2-phase system with 3-fold symmetry, i.e. M=2 and k=3. The offset angle α between the respective single pickup coils 703, 704 is determined in this instance as:

$$\alpha = 360°/k/M/2$$

The above formula applies to pickup coil arrangements having an even number of single pickup coils. In the example of FIG. 7 the single pickup coils 703, 704 would accordingly thus be rotated through α=360°/k/M/2=360°/3/2/2=30° in relation to one another. In the example from FIG. 8 (k=6) the single pickup coils 703, 704 would be rotated through α=360°/k/M/2=360°/6/2/2=15° relative to one another, on the other hand.

For pickup coil arrangements having an uneven number of single pickup coils, the offset angle α is calculated according to:

$$\alpha = 360°/k/M.$$

Aside from the embodiment of an astatic pickup coil arrangement that has been discussed hitherto, there are also single pickup coils that do not have this astatic behavior. The simplest example that may be mentioned is a pickup coil arrangement having three single pickup coils.

Figure 9:
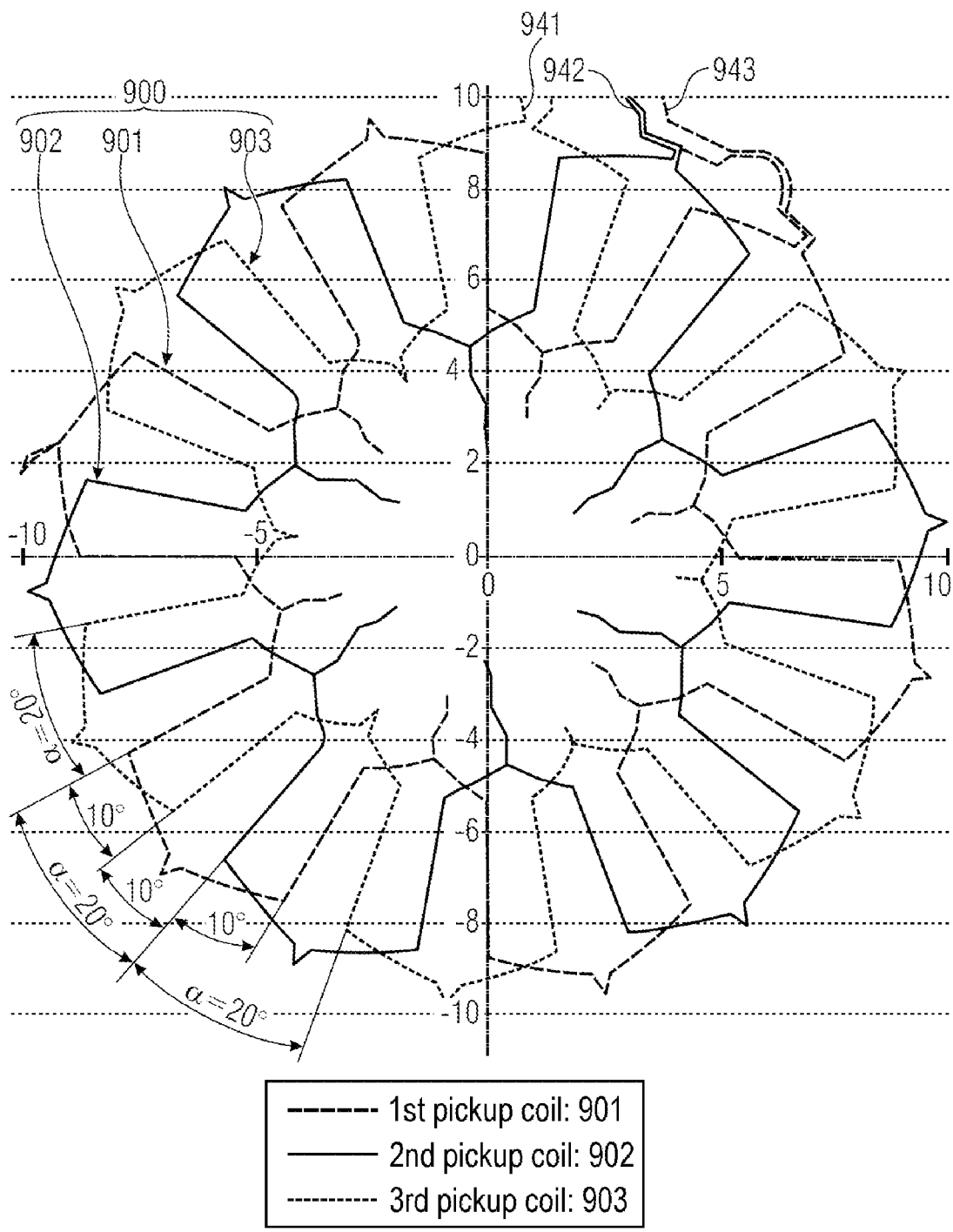
FIG. 9 shows a schematic plan view of a model of a non-astatic pickup coil arrangement having three non-astatic single pickup coils arranged in a manner offset from one another.

FIG. 9 shows an example of such non-astatic single pickup coils 901, 902, 903. The single pickup coils 901, 902, 903 can also be referred to as U, V and W coils, and they can have a substantially identical shape. As can be seen here, the single pickup coils 901, 902, 903 have simply routed turns. That is to say that, in contrast to an astatic single pickup coil, the non-astatic single pickup coils 901, 902, 903 shown here have no alternate turns with opposite winding direction. The non-astatic single pickup coils 901, 902, 903 are therefore not per se robust in the face of stray fields.

However, the single pickup coils 901, 902, 903 can be connected to a circuit for signal processing. The circuit can calculate the differences for coil pairs, for example U-V, V-W, W-U, in order to compensate for homogeneous stray fields that affect all of the single pickup coils 901, 902, 903.

Since the non-astatic single pickup coils 901, 902, 903 have no turns wound in opposite senses, each of the single pickup coils 901, 902, 903 delivers a respective individual signal. Angle sensors with uneven-numbered M also have an uneven number of non-astatic single pickup coils, i.e. there are no further non-astatic single pickup coils present that would generate an additional inverted signal.

The response can be different again for a pickup coil arrangement with even-numbered M, however. As was already discussed previously for the special case of "redundant" single pickup coils that is included herein, it would also be possible to imagine four such non-astatic single pickup coils for M=2, which are rotated not through 360°/6/3=20° (for k=6) but rather through 360°/6/4=15°, however. In that case the first single pickup coil would have a maximum signal in a target position in which the third single pickup coil has a minimum signal, i.e. the signals would then be (electrically) phase-shifted through 180° and the third and fourth single pickup coils would then therefore be "redundant" or superfluous again. This example would thus be a pickup coil arrangement with even-numbered M and a "redundant" half, i.e. one half (M/2) of the non-astatic single pickup coils present would be sufficient, and the other half (M/2) of the non-astatic single pickup coils present would be redundant (here: M=2 and four single pickup coils, two of these being redundant and hence being able to be disregarded when determining the variable M).

In the example of a pickup coil arrangement with unevennumbered M (here: M=3) depicted in FIG. 9, the three single pickup coils 901, 902, 903 generate three signals in total, these signals having a phase offset in relation to one another.

When the rotor rotates at constant velocity of rotation, an almost sinusoidal RF signal is generated in each of the three single pickup coils 901, 902, 903, the signals having a phase offset of 360°/M=360°/3=120° among one another in the example described here. When the rotor rotates through 360° (mechanical rotation angle), the envelopes, i.e. the demodulated LF signals, have k periods. That is to say that if the arctangent is calculated from the ratio of the signals, the result varies by k*360°, which leads to 1080° (electrical angle) in total.

Figure 10:
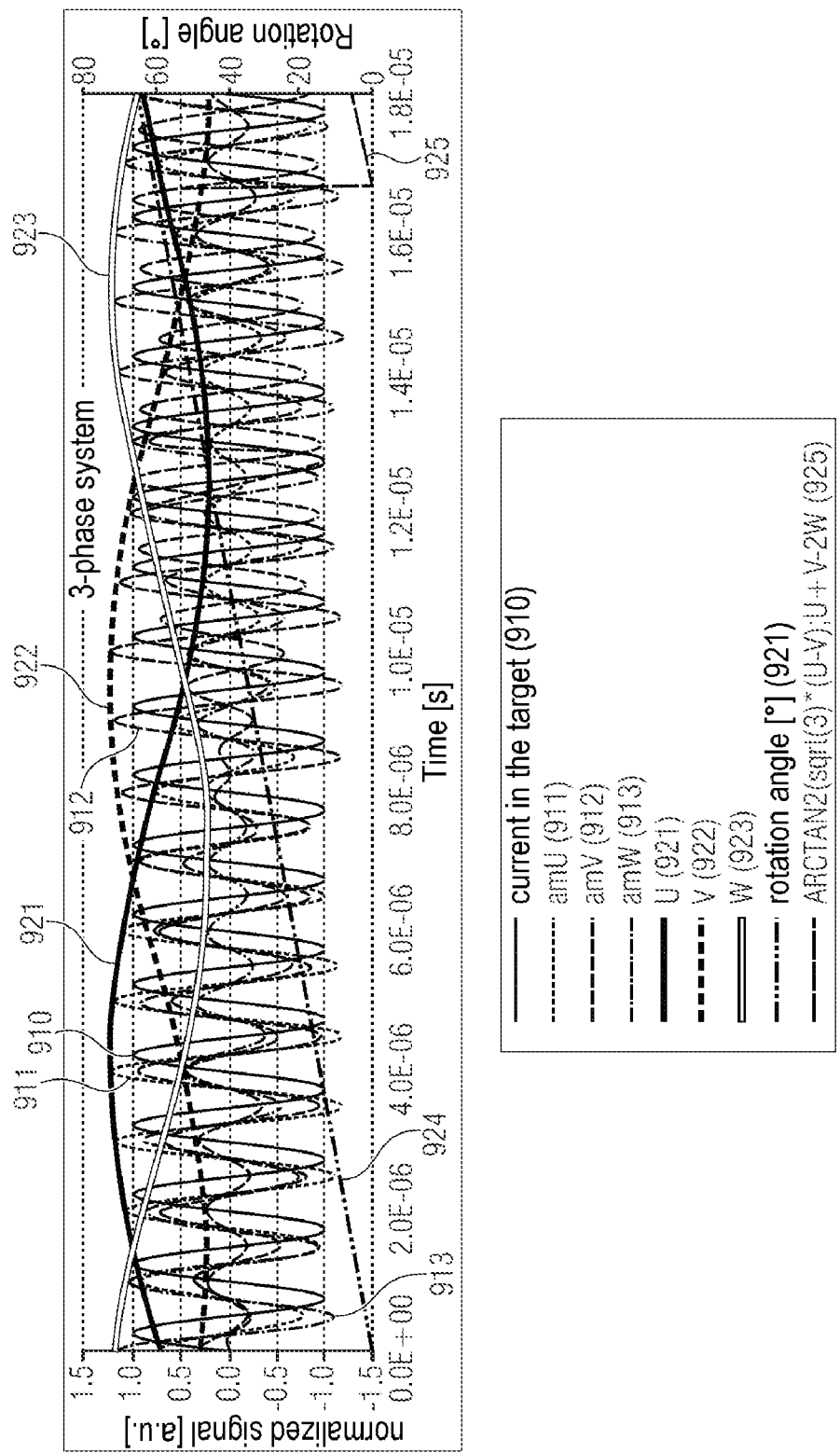
FIG. 10 shows a graphical representation of the temporal signal characteristic of a 3-phase system of non-astatic coils with a quickly rotating target.

FIG. 10 shows a plot of signals of such a pickup coil arrangement having three single pickup coils in the time domain. Here too, the time is again plotted on the abscissa between 0 μs and 18 μs. The curve 910 represents the eddy current in the target that is produced by the field coil. The curve oscillates at 1 MHz, is free of mean values and has a constant amplitude. In this example too, the rotor rotates again at an angular velocity of 360°/100 μs, corresponding to a very high revolution count of $6*10^5$ revolutions.

The amplitude-modulated RF signals amU, amV, amW are the voltages induced in each of the three single pickup coils 901, 902, 903. The three single pickup coils 901, 902, 903 can have an identical shape, e.g. with a 6-fold (k=6) symmetry, incidentally like the target, and the three single pickup coils 901, 902, 903 can be arranged in a manner rotated through a geometric offset angle α in relation to one another. Here too, the geometric offset angle α is again determined based on the number k of the k-fold symmetry of the system and the number M of single pickup coils present per pickup coil arrangement, or the different signals phase-shifted in relation to one another that are generated per pickup coil arrangement. In this example the three single pickup coils 901, 902, 903 (M=3) each have a 6-fold symmetry, i.e. k=6. Two adjacent single pickup coils are thus accordingly offset from one another by α=360°/k/M=360°/6/3=20°. That is to say that the second single pickup coil 902 is rotated through 20° in relation to the first single pickup coil 901, and the third single pickup coil 903 is rotated through 20° in relation to the second single pickup coil 902. The third single pickup coil 903 is therefore rotated through 40° in total in relation to the first single pickup coil 901.

This ensures that the respective signals U, V, W of the respective single pickup coil 901, 902, 903 have a 120° phase offset in relation to one another, specifically in the electrical angle domain, the electrical angle again corresponding to k times the mechanical angle here too. It will be noted at this juncture that reference is again made to two different phase offsets here too. First, the amplitude-modulated RF signals amU, amV, amW (see curves 911, 912, 913 in FIG. 10) involve a temporal phase offset. The baseband signals, i.e. the demodulated LF signals U, V, W (see curves 921, 922, 923 in FIG. 10), involve a phase offset in reference to the rotation angle, on the other hand.

In the case of the non-astatic coils discussed with reference to FIGS. 9 and 10, the RF signals, i.e. the voltages amU (911), amV (912) and amW (913), are all in phase, but with a 90° phase offset in relation to the induced current in the target, according to Faraday's law of induction. The RF signals, i.e. the voltages amU (911), amV (912) and amW (913), are moreover amplitude-modulated, i.e. they have a carrier frequency whose amplitude varies based on the position of the rotor relative to the stator.

The amplitude information contained therein can be demodulated, which results in the (upper, positive components of the) envelopes, i.e. the demodulated LF signals U (921), V (922) and W (923). The demodulated LF signals U (921), V (922) and W (923) have a not insignificant mean value. They can therefore be obtained from a non-synchronous demodulation, which in turn is simpler than a synchronous demodulation, although a synchronous demodulation would also work.

All of the demodulated LF signals U (921), V (922) and W (923) have the same mean value. This mean value can be eliminated by subtracting signals, e.g. U-V, V-W, W-U, as a result of which just the almost sinusoidal change in the signals U, V, W in comparison with the rotation angle is left.

As mentioned at the outset, the RF signals amU, amV, amW are not robust in the face of stray fields, i.e. they are non-astatic. This means that surrounding external magnetic changes of flux add undesirable induction voltages to the signals amU, amV, amW. Since the single pickup coils 901, 902, 903 are substantially identical and rotated through the offset angle α in relation to one another, however, homogeneous interference fields occur in all three single pickup coils 901, 902, 903 at the same time and to the same extent. They are therefore also eliminated when the LF signals U, V, W are subtracted (U-V, V-W, W-U).

Alternatively, the amplitude-modulated RF signals amU, amV, amW can also be subtracted from one another first (amU-amV, amV-amW, amW-amU), and then these differences can be demodulated. The plots shown in FIG. 8 and FIG. 10 have been used to show the method of difference formation for the LF signals U, V, W. In practice, the method of difference formation for the RF signals amU, amV, amW can be more practical.

Figure 11:
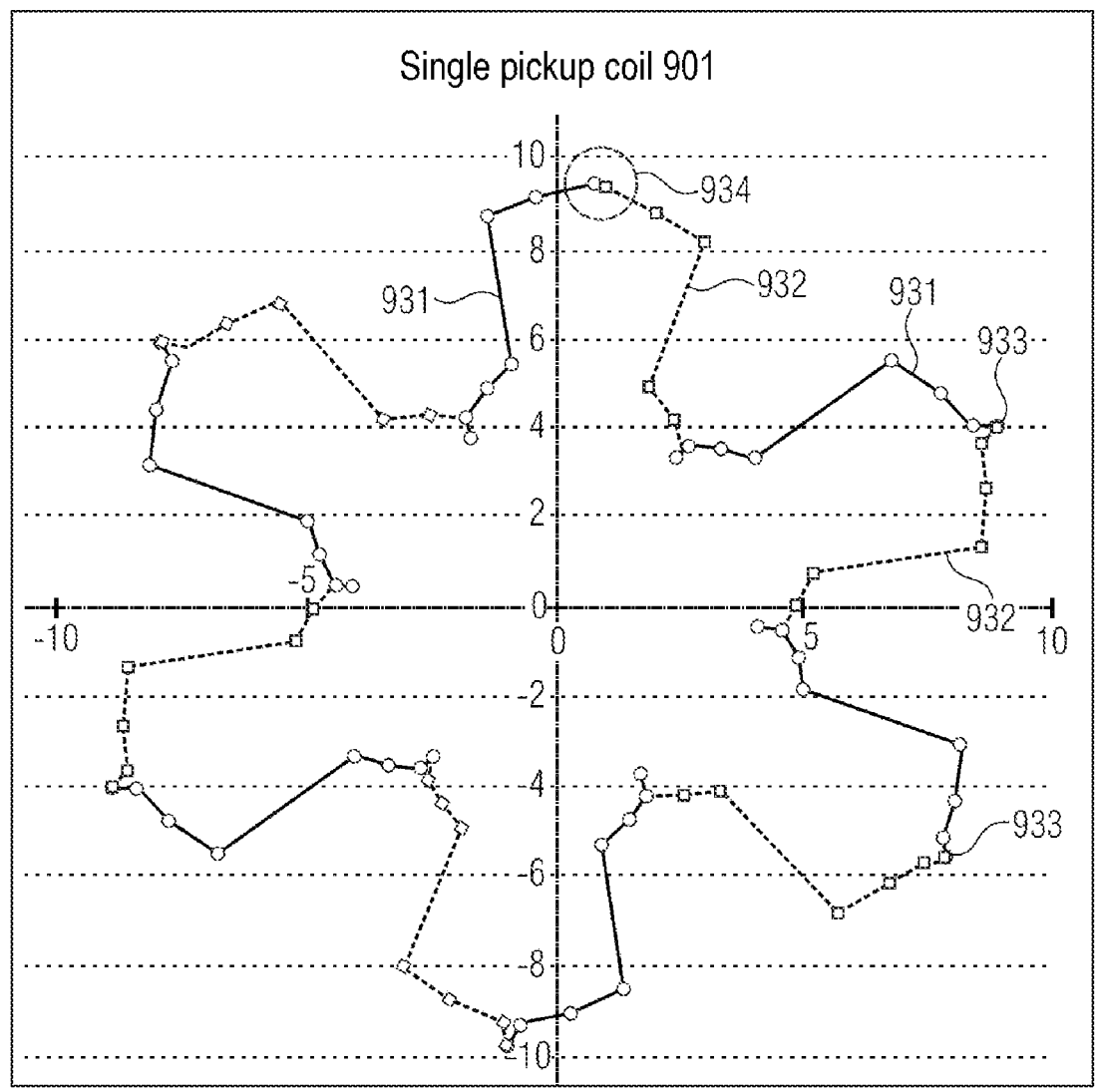
FIG. 11 shows a schematic view of a model of a non-astatic single pickup coil and the embodiment thereof in different metallization layers of a substrate.

The systems described hitherto have a systematic angle error that can lead to measurement inaccuracies when determining the rotation angle. Reference will be made to FIG. 11 for an explanation of this systematic angle error.

FIG. 11 shows, purely for the sake of clarity, an individual single pickup coil 901 from the example of an inductive angle sensor having a pickup coil arrangement with three single pickup coils (i.e. M=3) and k=6-fold symmetry that was previously discussed with reference to FIG. 9. One half of each of the turns (blue lines) can be produced in the form of conductor tracks 931 on a substrate, for example a PCB (printed circuit board), these conductor tracks 931 being able to be produced in a first metallization layer in the substrate. The other halves of each of the turns (red lines) can be produced in the form of conductor tracks 932 on a substrate, for example a PCB (printed circuit board), these conductor tracks 932 being able to be produced in a different, second metallization layer in the substrate. The first metallization layer can be arranged on a first main side (e.g. top) of the substrate, and the second metallization layer can be arranged on an opposite, second main side (e.g. bottom) of the substrate.

The conductor tracks 931, 932 can have contact made with one another through the substrate by means of plated-through holes (vias) 933. The single pickup coil 901 can be connected by means of suitable connecting wires to a sensor circuit that processes the induction signals of the single pickup coil 901. Connecting wires can be connected to the conductor tracks 931, 932, for example at a connection point 934 at which the conductor tracks 931, 932 are not connected to one another by means of a via.

To explain further, reference will now again be made to FIG. 9, which shows three such single pickup coils 901, 902, 903 in an overall pickup coil arrangement 900. Here, however, the different colors indicate not different metallization layers but rather the different single pickup coils 901, 902, 903. Moreover, the aforementioned connecting wires 941, 942, 943 are shown for each of the single pickup coils 901, 902, 903.

As was already mentioned at the outset, the single pickup coils 901, 902, 903 in this example are arranged in a manner offset from one another by the geometric offset angle α=360°/k/M=360°/6/3=20°. Here too the single pickup coils 901, 902, 903 are provided in the form of conductor tracks produced in different metallization layers (e.g. top vs. bottom). Since the conductor tracks of an individual single pickup coil, as was described previously, alternate between the two metallization layers by means of vias, every second conductor track, shown in FIG. 11 here, is therefore produced in a different metallization layer. That is to say that although the individual single pickup coils 901, 902, 903 are rotated through the offset angle α=20° in relation to one another, the individual single pickup coils 901, 902, 903 each have radial segments that are at a distance of only 10° from one another. That is to say that the radial segments in an individual metallization layer were arranged at a 20° spacing, which is in turn important for the innovative design described herein.

Figure 12:
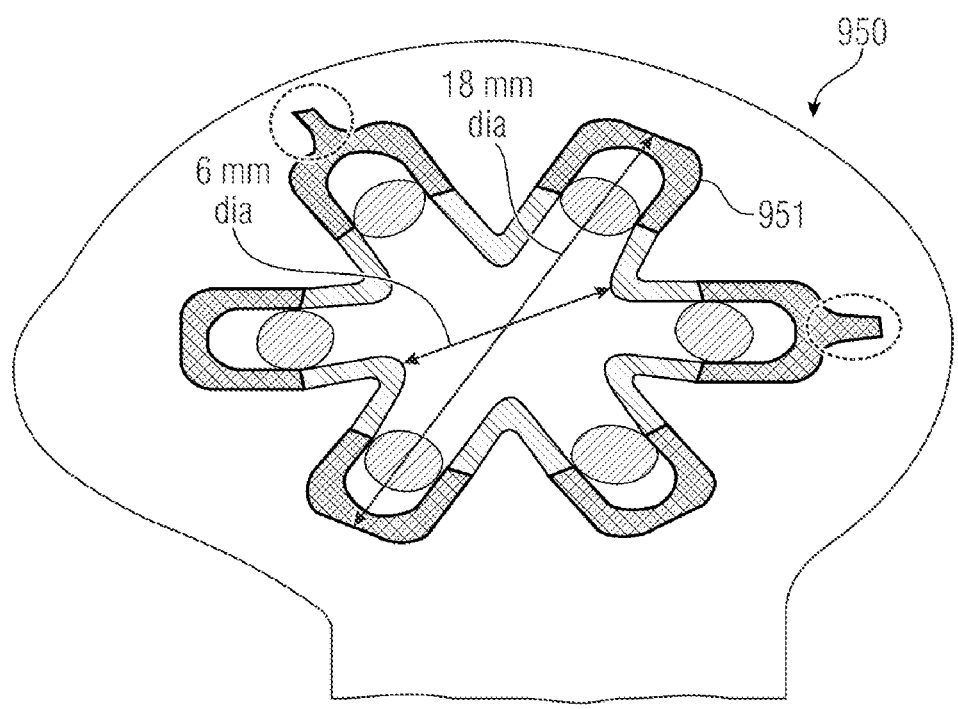
FIG. 12 shows a plan view of a target arrangement embedded in a plastic matrix.
Figure 13:
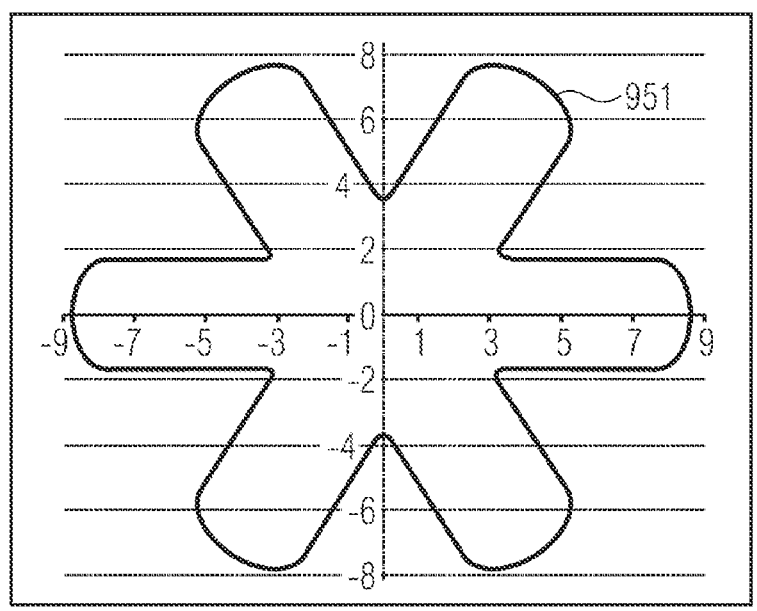
FIG. 13 shows a schematic plan view of a model of this target arrangement.

The rotor or the target attached thereto can also have a matching k-fold symmetry. In this example the target can thus also have a 6-fold symmetry. FIGS. 12 and 13 show an illustrative rotor 950 having an inductive target 951. FIG. 12 shows a real embodiment of a copper target, embedded in a plastic matrix. The target 951 may have been manufactured from a punched metal sheet, such as e.g. a copper sheet. The target 951 can alternatively be produced as a conductor track on a PCB. FIG. 13 shows a modelled plot of the target 951. The thin lines are depicted purely schematically here and essentially symbolize the neutral fiber of the otherwise solid copper coil.

Provided that all of the coils of the inductive angle sensor are processed and mounted without error and precisely, i.e. without substantial tolerance differences, the system (i.e. the inductive angle sensor) normally nevertheless has a systematic angle error dphi.

This systematic angle error dphi can be calculated using the arctangent. An example that will furthermore be mentioned is a pickup coil arrangement having three non-astatic single pickup coils U, V, W (M=3), the single pickup coils U, V, W having a 6-fold symmetry (k=6). It is therefore first possible to calculate the rotation angle between the rotor and the stator in the electrical angle domain as follows:

$$phi'=\arctan_2(sqrt(3)*(U-V);-2*W+U+V),$$

where $\arctan_2$ (x; y) provides the angle between a vector and the positive x-axis, wherein the vector has the x-component x and the y-component y. The target can be fixed to a shaft. The rotational position of this shaft, and hence the rotational position of the target in relation to the single pickup coils on the stator, can be expressed in the mechanical angle domain as phi'=phi*k. The angle error dphi in the mechanical domain can therefore be calculated according to:

$$dphi=(\mod(phi'-k*phi+180°;360°)-180°)/k$$

The rotation angle phi' in the electrical domain is also referred to as electrical angle herein and indicates the k periods of the signals during a full mechanical or actual revolution of 360°, k again describing the variable of the k-fold symmetry here too. The rotation angle phi in the mechanical domain, on the other hand, describes the actual mechanical rotation angle, in other words the actual revolution through 360°, and is also referred to as mechanical angle herein.

Figure 14:
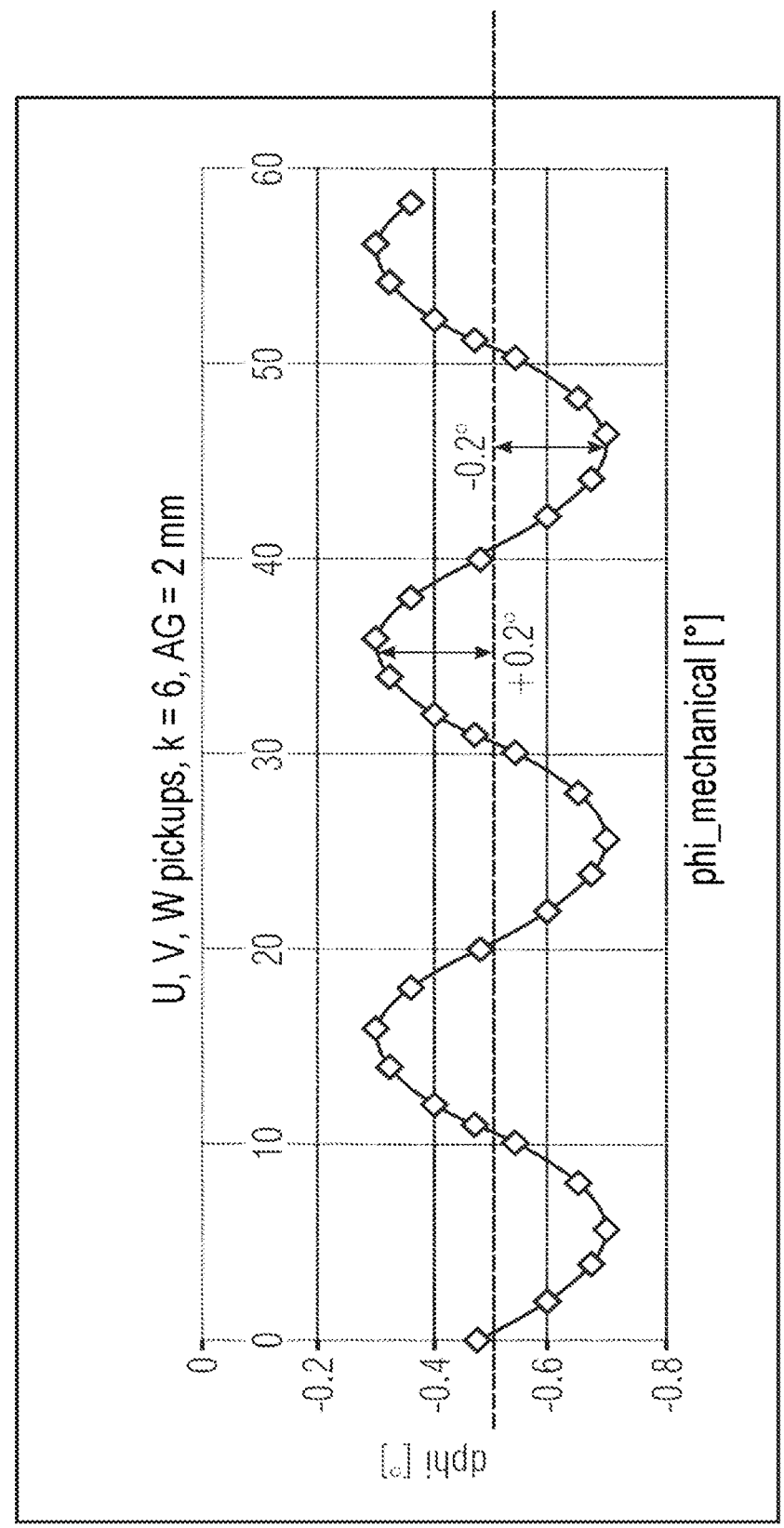
FIG. 14 shows a graphical representation of the curve profile of a systematic angle error band.

FIG. 14 shows a nonlimiting example of a systematic angle error of this kind for a pickup coil arrangement having three single pickup coils U, V, W (M=3), with 6-fold symmetry, given an air gap of AG=2 mm. The air gap AG is the axial distance between the target and the pickup coil arrangement.

It can be seen in FIG. 14 that the systematic angle error dphi has an approximate sinusoidal form. The mean value of the angle error dphi in this example is approximately −0.5°, which is initially insignificant in the context of the innovative design described herein, however. It can be seen, however, that the angle error dphi varies around the mean value, specifically by approximately ±0.2° in this example. This variation around the mean value of the angle error dphi is also referred to as systematic error band. The amplitude of this error band becomes smaller as the air gap becomes larger. The error band increases drastically, on the other hand, as the air gap becomes smaller.

However, the angle sensor described herein allows the systematic error band (not the mean value of dphi) to be kept as small as possible despite a small air gap. As small as possible in this context means that the systematic angle error dphi is compensated for such that it has only an imperceptible effect on the angle measurement. Although the mean value of dphi can change with the air gap—such a change caused by the air gap occurs e.g. when the circuit board is very thick—a constant mean value is insignificant because it can be measured when the system is installed and is therefore known to the system. The mean value is not supposed to change (due to temperature or air gap), however.

Figure 1A:
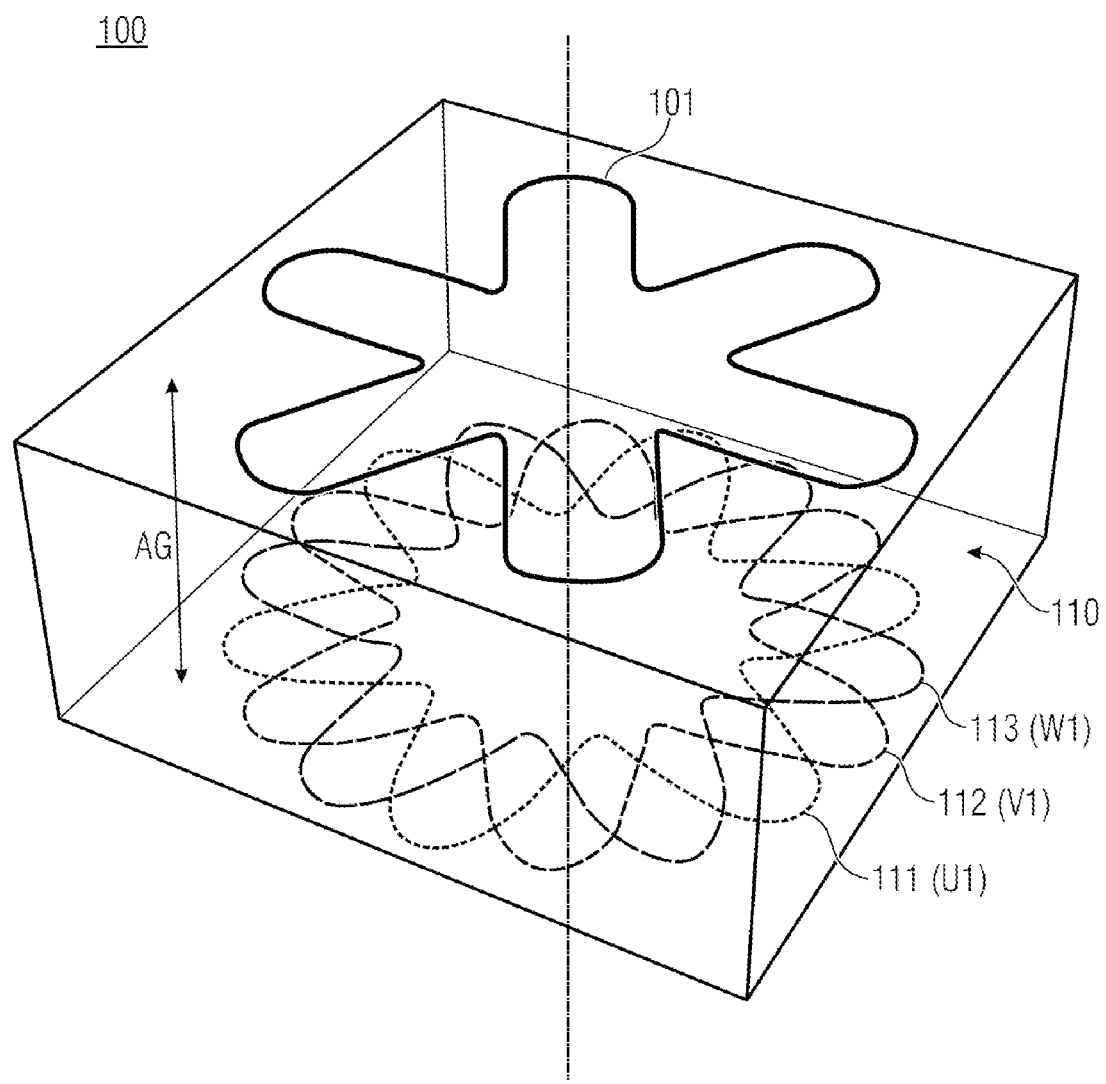
FIG. 1A shows a schematic perspective view of a model of an inductive angle sensor having an individual pickup coil arrangement according to an exemplary embodiment.

FIG. 1A shows an exemplary embodiment of an inductive angle sensor 100. According to the innovative design described herein, the angle sensor 100 certainly has a first pickup coil arrangement 110 and a second pickup coil arrangement. However, the second pickup coil arrangement is not depicted here for the time being for the sake of better clarity.

FIG. 1A shows a 3D model of the target 101 arranged on a rotor, which is not depicted here. The first pickup coil arrangement 110 is arranged on a stator, which is likewise not depicted explicitly here. The pickup coil arrangement 110 in this nonlimiting exemplary embodiment has three non-astatic single pickup coils 111, 112, 113. In a sense the design described herein naturally also applies to astatic pickup coil arrangements, however, as were described earlier on.

The non-astatic pickup coil arrangement 110 depicted here delivers three signals having a phase offset in relation to one another, which in this case come from the three single pickup coils 111, 112, 113. This is thus an M-phase system where M=3, i.e. it is a 3-phase system.

The stator, which has the pickup coil arrangement 110, and the rotor, which has the target 101, are arranged around a common axis of rotation R. Both the pickup coil arrangement 110 and the target 101 can be arranged concentrically around the axis of rotation R. The axial distance between the target 101 and the pickup coil arrangement 110 describes the air gap, which is also referred to as AG.

The target 101 and the pickup coil arrangement 110 have a k-fold symmetry, where k=6, i.e. the target 101 and the pickup coil arrangement 110 in this nonlimiting exemplary embodiment have a 6-fold symmetry. The innovative design described herein can be used for systems (i.e. in inductive angle sensors) with any k-fold symmetry, however.

The single pickup coils 111, 112, 113 of the pickup coil arrangement 110 having uneven-numbered M (here: M=3) that is depicted here by way of illustration are rotationally offset about the axis of rotation R by a geometric offset angle α=360°/k/M relative to one another. For the pickup coil arrangement having three single pickup coils 111, 112, 113 and 6-fold symmetry that is depicted here, this means: α=360°/6/3=20°.

Figure 1B:
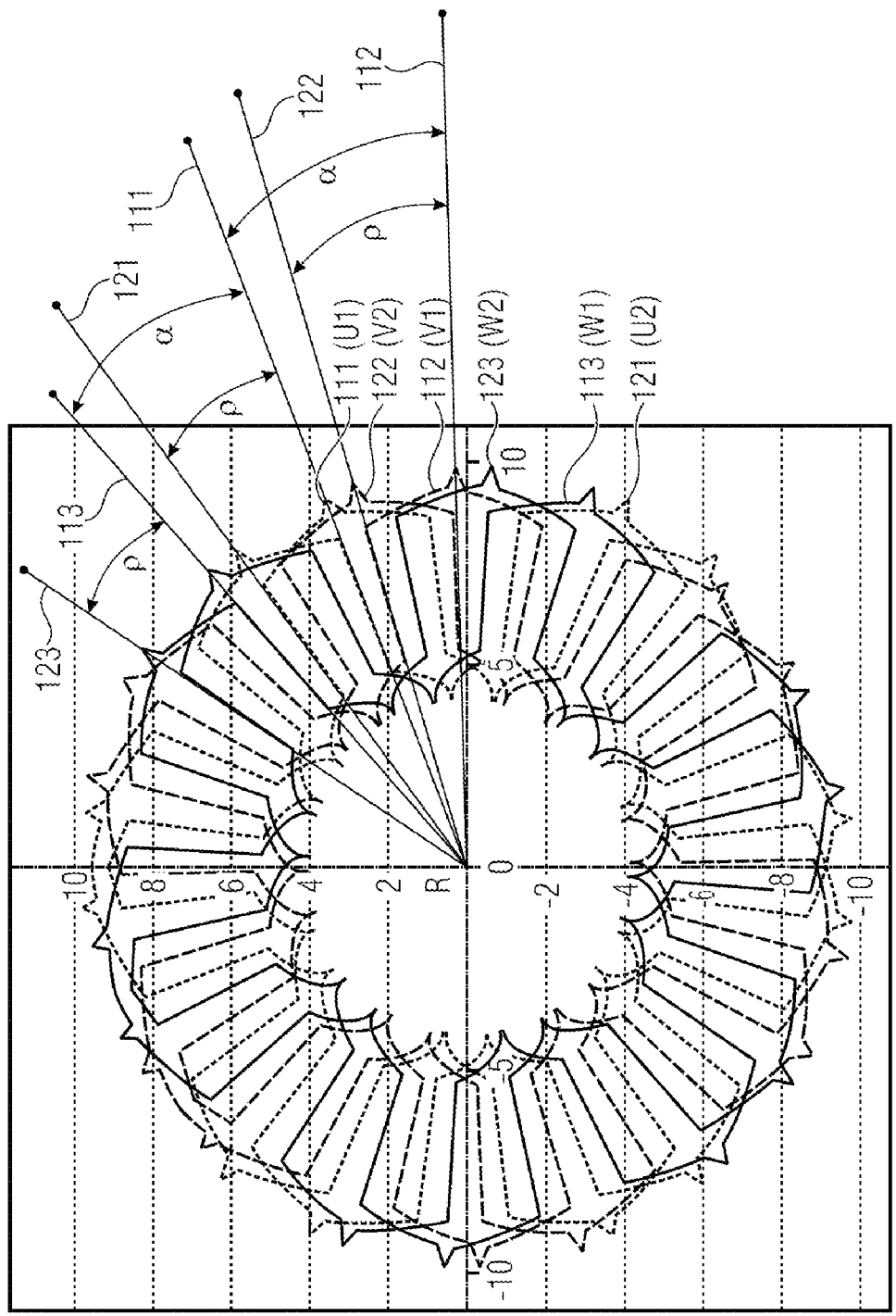
FIG. 1B shows a schematic plan view of a model of two pickup coil arrangements arranged in a manner offset from one another, according to an exemplary embodiment.

FIG. 1B now shows a 3D model in a plan view of a stator, which now additionally has a second pickup coil arrangement 120 besides the aforementioned first pickup coil arrangement 110. Purely for the sake of clarity, only the two pickup coil arrangements 110, 120 with their respective single pickup coils are shown here. The two pickup coil arrangements 110, 120 can be substantially identical, i.e they can have a substantially identical geometric shape and the same number of single pickup coils with the same number of turns and the same shaping.

The first pickup coil arrangement 110 thus has an uneven number M of single pickup coils, namely the aforementioned three single pickup coils 111, 112, 113. Two adjacent single pickup coils 111, 112, 113 have a geometric offset angle α=360°/k/M. The same applies to the second pickup coil arrangement 120. The second pickup coil arrangement 120 likewise has an uneven number M of single pickup coils, namely three single pickup coils 121, 122, 123. Two adjacent single pickup coils 121, 122, 123 have a geometric offset angle α=360°/k/M. In this example, two adjacent single pickup coils are rotated (around the axis of rotation R) through 20° in relation to one another.

According to the innovative design described herein, however, the respective pickup coil arrangements 110, 120 as a whole are also rotated through a further geometric offset angle ρ (rho) relative to one another. That is to say that the first pickup coil arrangement 110 with its respective single pickup coils 111, 112, 113 is rotated (around the axis of rotation R) through the geometric offset angle ρ in relation to the second pickup coil arrangement 120 with its respective single pickup coils 121, 122, 123. According to one exemplary embodiment, the geometric offset angle can be for example ρ≤α (where α=360°/k/M for uneven-numbered M or α=360°/k/M/2 for even-numbered M).

The geometric offset angle ρ can vary based on the type of signal evaluation of the signals of the single pickup coils 111, 112, 113, 121, 122, 123 of the pickup coil arrangements 110, 120. According to the innovative design described herein, the combination apparatus 130 can be designed to perform a signal combination, wherein signals of the first pickup coil arrangement 110 can be combined with signals of the second pickup coil arrangement 120 so as, on the basis thereof, to ascertain the angle-error-compensated rotation angle phi' between the stator and the rotor. In some exemplary embodiments, the signals referred to here can be for example induced output signals or induction signals in what is known as the induction signal domain. In other exemplary embodiments, the signals referred to here can be for example rotation angle signals in what is known as the angle signal domain.

Depending on what type of signal processing is performed, i.e. what type of signals are processed in which domain, the offset angles ρ of the two pickup coil arrangements 110, 120 vary in relation to one another. This can be taken into consideration with a correction factor n/4. In general, the geometric offset angle ρ taking into consideration the correction factor just mentioned can be ρ=α*n/4, for example, n being a whole number greater than 1. As before, for pickup coil arrangements 110, 120 having uneven-numbered M: ρ=360°/k/M*n/4, whereas for pickup coil arrangements 110, 120 having even-numbered M: ρ=360°/k/M/2*n/4.

According to one conceivable nonlimiting exemplary embodiment, it is possible that n=2. This can be the case for example if the signal combination involves a single rotation angle signal phi1', phi2' specific to the respective pickup coil arrangement 110, 120 first being ascertained for each of the output signals induced in the pickup coil arrangements 110, 120 and then these single rotation angle signals phi1', phi2' being combined with one another so as, based on this combination of the single rotation angle signals phi1', phi2', to ascertain the angle-error-compensated rotation angle phi' between the stator and the rotor. In this embodiment, the signal combination thus contains a combination of angles or angle signals, wherein a correction factor of n=2 applies. In this case, the pickup coil arrangements 110, 120 can thus be offset by or rotated through the offset angle ρ=α*n/4=α*2/4=α/2 relative to one another.

According to a further conceivable nonlimiting exemplary embodiment, it is possible that n=3. This can be the case for example if the signal combination involves the output signals induced in each of the pickup coil arrangements 110, 120 first being combined with one another and, based on this combination of the induced output signals, the angle-error-compensated rotation angle phi' between the stator and the rotor then being ascertained. In this embodiment, the signal combination thus involves a combination of induced output signals, wherein a correction factor of n=3 applies. In this case, the pickup coil arrangements 110, 120 can thus be offset from or rotated through the offset angle ρ=α*n/4=α*3/4 relative to one another.

If the induced output signals are thus combined with one another and the angle is calculated only then, it holds that n=3. If two angles are first calculated from the induced output signals and these angles are then combined, however, it holds that n=2. It is also possible for an angle to initially be an angle signal. For this reason, an induction signal domain and an angle signal domain will be defined here. The induction signal domain includes the voltages that are able to be tapped off from the single pickup coils, and also downstream of any preamplifier, filter, demodulator, analog-to-digital converter. In addition, it may also be possible for a signal to be added (zero-point correction), the whole to be multiplied (normalization of the amplitudes), and linear combinations of the signals to be calculated (orthogonality error correction). The at least two signals are then used to calculate at least one angle (usually using the CORDIC algorithm, which calculates the arctan). The boundary between the angle signal domain and the induction signal domain can be defined as follows in this instance: if all of the signals that come from the single pickup coils directly or by means of combination are multiplied by a single arbitrary number between 0.9 and 1.1 then the output angle remains unaffected thereby so long as these signals were in the induction signal range—if they are in the angle signal range then the output angle changes by this number (a number close to one was taken because a large number could lead to the computer logic overflowing or could have the circuit operating at the control limits).

In this exemplary embodiment, the two pickup coil arrangements 110, 120 are moreover electrically coupled to one another and therefore form one or more single pickup coil pairs. In such a single pickup coil pair, each single pickup coil of the first pickup coil arrangement 110 is electrically connected to a respective single pickup coil of the second pickup coil arrangement 120. In the example depicted in FIG. 1B here, the electrical connection is a series connection, i.e. the respective single pickup coils of a single pickup coil pair are connected to one another in series. A parallel connection would likewise be conceivable.

In the nonlimiting exemplary embodiment depicted in FIG. 1B here, the two pickup coil arrangements 110, 120 are interconnected to form multiple pickup coil pairs and are rotated through the offset angle ρ=15° in relation to one another. Accordingly, the respective single pickup coils are also rotated through the angle ρ (here: 15°) in relation to one another. That is to say that the first single pickup coil 111 of the first pickup coil arrangement 110 is rotated through 15° in relation to the first single pickup coil 121 of the second pickup coil arrangement 120, the second single pickup coil 112 of the first pickup coil arrangement 120 is rotated through 15° in relation to the second single pickup coil 122 of the second pickup coil arrangement 120, and the third single pickup coil 113 of the first pickup coil arrangement 110 is rotated through 15° in relation to the third single pickup coil 123 of the second pickup coil arrangement 120.

The geometric offset angle ρ through which all of the pickup coil arrangements 110, 120 are rotated in relation to one another can be variable within specific limits. Where this description cites absolute values for the geometric offset angle ρ, these absolute values also apply in a tolerance range of ±10% or of ±1°. That is to say that the innovative design described herein can still deliver satisfactory results even in the case of divergences in angles cited herein in a range of ±10% or of ±1°.

Figure 1C:
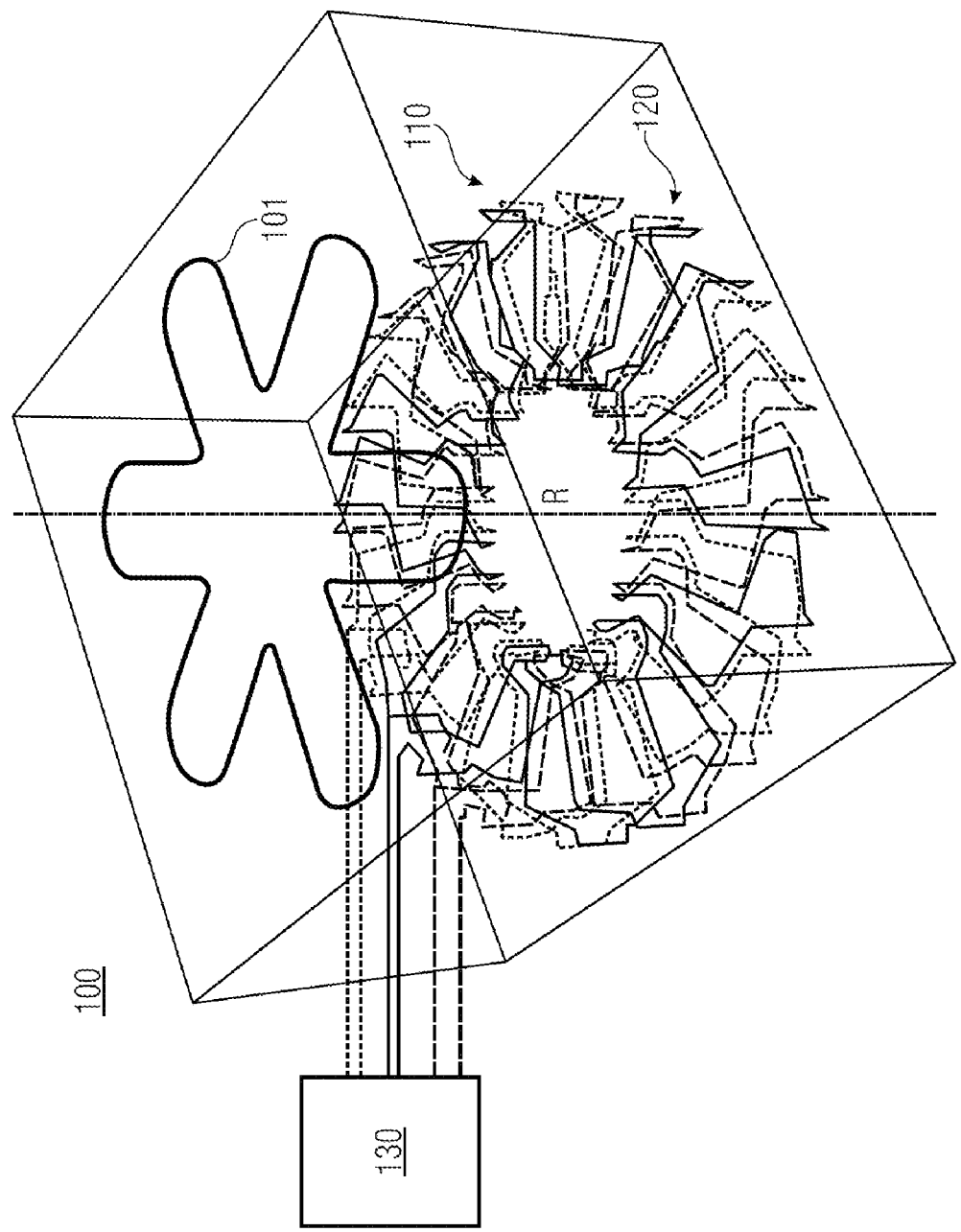
FIG. 1C shows a schematic perspective view of a model of an inductive angle sensor having two pickup coil arrangements arranged in a manner offset from one another, according to an exemplary embodiment.

FIG. 1C shows a 3D model of an inductive angle sensor 100 according to the innovative design described herein. It schematically shows the target 101 and the previously described pickup coil arrangements 110, 120 rotated through the geometric offset angle ρ=α*n/4 in relation to one another. Here too the pickup coil arrangements 110, 120 are connected up to form multiple single pickup coil pairs. The signal combination in this example involves a combination of induced output signals, i.e. ρ=3/4*α.

The innovative design described herein thus provides for providing at least one second pickup coil arrangement 120, which can be substantially identical to the first pickup coil arrangement 110 present but is rotated through the geometric offset angle ρ=α*n/4 relative to the first pickup coil arrangement 110. The second pickup coil arrangement 120, like the first pickup coil arrangement 110, can have a previously discussed systematic angle error dphi, or a corresponding angle error band. However, the curve of the systematic angle error of the second pickup coil arrangement 120 would, owing to the rotated arrangement in relation to the first pickup coil arrangement 110, be shifted along the horizontal axis by this very offset angle ρ (see FIG. 14). The curve of the angle error band of the second pickup coil arrangement 120 would therefore be shifted in relation to the curve of the angle error band of the first pickup coil arrangement 110 such that it had a maximum of locations at which the curve of the angle error band of the first pickup coil arrangement 110 has a minimum, or vice versa.

As was already mentioned at the outset, the inductive angle sensor 100 described herein has a combination apparatus 130 (see FIG. 1C). The combination apparatus 130 can be designed to suitably combine the signals of the first pickup coil arrangement 110 with the signals of the second pickup coil arrangement 120 and, on the basis thereof, to ascertain an angle-error-compensated rotation angle phi' between the stator and the rotor. That is to say that the ascertained rotation angle is corrected or compensated for the systematic angle error dphi described here or for the variations or mean value divergences in the applicable angle error band. The angle-error-compensated rotation angle can be either the mechanical rotation angle phi or the electrical rotation angle phi', the two rotation angles being convertible into one another according to phi'=phi*k. Where this description refers to a rotation angle, however, this always means the electrical rotation angle phi', unless the mechanical rotation angle phi is cited directly.

As was likewise already briefly mentioned at the outset, it can make a difference to the combination of the signals of the two pickup coil arrangements 110, 120 to calculate the rotation angle whether the induced output signals (induction signal domain) of the pickup coil arrangements 110, 120 are combined with one another or whether two angles are first calculated from the induced output signals and these angles are then combined. Accordingly, the calculation of the signals can differ, which will be explained in more detail below.

First, the signals referred to can be, as one alternative, the amplitude-modulated RF signals amU1 (802), amU2 (803) or amU (911), amV (912), amW (913) discussed previously with reference to FIGS. 8 and 10. That is to say that the calculation or ascertainment of the angle-error-compensated rotation angle phi' can be performed before the demodulation of the amplitude-modulated RF signals amU1 (802), amU2 (803) or amU (911), amV (912), amW (913).

According to a further exemplary embodiment, the calculation or ascertainment of the angle-error-compensated rotation angle phi' can alternatively be performed after the demodulation of the RF signals amU1 (802), amU2 (803) or amU (911), amV (912), amW (913). That is to say that the amplitude-modulated RF signals amU1 (802), amU2 (803) or amU (911), amV (912), amW (913) can first be demodulated in order to obtain the demodulated LF signals U1 (804), U2 (805) or U (921), V (922), W (923) discussed previously with reference to FIGS. 8 and 10. Following that, the angle-error-compensated rotation angle phi' can be calculated or ascertained based on a combination of the demodulated LF signals U1 (804), U2 (805) or U (921), V (922), W (923).

The combination of the signals that is referred to can be for example an averaging between the signals of the first pickup coil arrangement 110 and the signals of the second pickup coil arrangement 120.

According to one conceivable exemplary embodiment, the respective individual signals of the pickup coil arrangements 110, 120 can be evaluated individually. For this purpose, the combination apparatus 130 can be designed for example to calculate a first (electrical) rotation angle phi1' ascertained by means of the first pickup coil arrangement 110. The combination apparatus 130 can furthermore be designed to calculate a second (electrical) rotation angle phi2' ascertained by means of the second pickup coil arrangement 120. The combination apparatus 130 can subsequently form the mean value MW for these two rotation angle signals phi1', phi2', e.g. MW=(phi1'+phi2')/2. The combination apparatus 130 can also form the mean value MW for these two rotation angle signals phi1', phi2' by taking into consideration the offset angle ρ, e.g. MW= (phi1'+phi2'−ρ)/2. Omitting the offset angle ρ merely shifts the 0° reference angle and is therefore insignificant in most cases.

In practice, it is furthermore possible to take into consideration the permitted angle range of 0°-360°, with the angle phi_new' in the notation below corresponding to the angle-error-compensated rotation angle in the electrical domain:

$$\text{phi\_new'}=\text{mod}((\text{phi1'}+\text{phi2'}-10°)/2+180°;360°)-180°$$

or $$\text{phi\_new'}=\text{mod}((\text{phi1'}+\text{phi2'}-10°)/2;360°)$$

In the formulae above, a geometric offset angle ρ=10° is cited as a nonlimiting example. This stems from the fact that the single combination involves a single rotation angle signal phi1', phi2' specific to the respective pickup coil arrangement 110, 120 first being ascertained for each of the output signals induced in the pickup coil arrangements 110, 120 and then these single rotation angle signals phi1', phi2' being combined with one another, i.e. the correction factor n=2 can be used, wherein (here: for k=6, M=3 and n 2): ρ=α*n/4 or ρ=360°/k/M*n/4=360°/k/M*2/4=10°. The first formula above maps the angle from 0° to 360° into an interval between +180° and −180°. The second formula maps the angle from 0° to 360° into an interval between 0° and 360°. The averaging of the two rotation angle signals phi1' and phi2' of the first and second pickup coil arrangements 110, 120 eliminates the angle error (see FIG. 14) and delivers a very precise result for the calculation of the angle-error-compensated rotation angle between the rotor and the stator. The averaging removes the angle error band almost completely.

The angle-error-compensated rotation angle phi_new' indicated in the formulae above is indicated in the electrical domain. Here too it naturally again holds that the angle-error-compensated rotation angle is convertible into the mechanical domain according to $$\text{phi\_new'}=\text{phi\_new}*k.$$

In the notation provided here, phi_new' corresponds to the angle-error-compensated electrical rotation angle phi' otherwise described herein, and the angle phi_new corresponds to the angle-error-compensated mechanical rotation angle phi otherwise described herein.

The angle-error-compensated rotation angle phi can be ascertained in different ways, according to the innovative design described herein. Some conceivable exemplary embodiments for ascertaining the angle-error-compensated rotation angle phi are thus described below.

According to a first such exemplary embodiment, the inductive angle sensor 100 can have two pickup coil arrangements 110, 120, which can be electrically isolated from one another. The combination apparatus 130 can have a first circuit that is connected to the first pickup coil arrangement 110 and designed to calculate the first angle signal phi1' just described. The combination apparatus 130 can furthermore have a second circuit that is connected to the second pickup coil arrangement 120 and designed to calculate the second angle signal phi2'. The combination apparatus 130 can furthermore have a third circuit (or a microprocessor) that is designed to combine the first and second angle signals phi1', phi2' with one another so as, on the basis thereof, to ascertain the angle-error-compensated rotation angle phi_new' or phi_new between the stator and the rotor. This can be performed in digital code, or using analog signals in the voltage or current domain.

According to a second such exemplary embodiment, the design of the first exemplary embodiment mentioned above can essentially be adopted. Only one individual circuit is used, however. This individual circuit can then be connected both to the first and to the second pickup coil arrangement 110, 120, not necessarily permanently but rather also temporarily, e.g. by using a time-division multiplexing method. For example the control apparatus can thus accordingly have an individual circuit designed to determine the first and second angle signals phi1', phi2' by using a time-division multiplexing method. In this instance, in a first time interval the individual circuit can calculate at least one signal component of the first angle signal phi1' based on the signals (amplitude-modulated RF signals or demodulated LF signals) of the first pickup coil arrangement 110, and in a different, second time interval the individual circuit can calculate at least one signal component of the second angle signal phi2' based on the signals (amplitude-modulated RF signals or demodulated LF signals) of the second pickup coil arrangement 120. The combination apparatus 130 can also take into consideration that phi2' corresponds to a later position of the rotor than phi1', e.g. on account of different sampling times.

According to a third such exemplary embodiment, the two pickup coil arrangements 110, 120, as already described previously, can be electrically combined in the sense of a series or parallel connection to form multiple single pickup coil pairs. In particular, the respective single pickup coils 111, 112, 113; 121, 122, 123 of the pickup coil arrangements 110, 120 can be connected to one another in this instance. As such, for example the first single pickup coil 111 (U1) of the first pickup coil arrangement 110 can be electrically connected to the first single pickup coil 121 (U2) of the second pickup coil arrangement 120. Additionally, the second single pickup coil 112 (V1) of the first pickup coil arrangement 110 can be electrically connected to the second single pickup coil 122 (V2) of the second pickup coil arrangement 120. Furthermore, the third single pickup coil 113 (W1) of the first pickup coil arrangement 110 can be electrically connected to the third single pickup coil 123 (W2) of the second pickup coil arrangement 120. The two interconnected individual pickup coil arrangements 110, 120 therefore essentially form a single interconnected pickup coil arrangement.

The electrical interconnection of the respective single pickup coils 110, 120 can be made in the form of a series connection or in the form of a parallel connection.

Accordingly, two interconnected single pickup coils can thus form a pickup coil pair. That is to say that the first single pickup coil 111 (U1) of the first pickup coil arrangement 110 and the first single pickup coil 121 (U2), connected up (in series or parallel) thereto, of the second pickup coil arrangement 120 together form a first pickup coil pair U=U1+U2. The second single pickup coil 112 (V1) of the first pickup coil arrangement 110 and the second single pickup coil 122 (V2), connected up (in series or parallel) thereto, of the second pickup coil arrangement 120 together form a second pickup coil pair V=V1+V2. The third single pickup coil 113 (W1) of the first pickup coil arrangement 110 and the third single pickup coil 123 (W2), connected up (in series or parallel) thereto, of the second pickup coil arrangement 120 together form a third pickup coil pair W=W1+W2.

Since the two pickup coil arrangements 110, 120 are rotated through the geometric offset angle ρ (rho) in relation to one another, the respectively interconnected single pickup coils U1, U2; V1, V2; W1, W2 of a pickup coil pair U, V, W are accordingly also each offset by the offset angle ρ in relation to one another.

Put into more general words, this third exemplary embodiment thus provides an inductive angle sensor 100 in which the first and second pickup coil arrangements 110, 120 are electrically coupled to one another and form one or more single pickup coil pairs U, V, W. In each single pickup coil pair U, V, W, a respective one of the single pickup coils, e.g. 111 (U1), of the first pickup coil arrangement 110 is interconnected in a series connection or parallel connection with a respective single pickup coil, offset therefrom by the geometric offset angle ρ, e.g. 121 (U2), of the second pickup coil arrangement 120.

In particular in the case of a series connection the single signals of the respective interconnected single pickup coils add up to form a joint signal. That is to say that each pickup coil pair U, V, W delivers a signal that corresponds to the sum of the two single signals of the single pickup coils respectively interconnected in this pickup coil pair U, V, W. As such, for example the first pickup coil pair U delivers a signal that is made up of the signal of the first single pickup coil 111 (U1) of the first pickup coil arrangement 110 and the signal of the first single pickup coil 121 (U2), connected up thereto, of the second pickup coil arrangement 120. The second pickup coil pair V delivers a signal that is made up of the signal of the second single pickup coil 112 (V1) of the first pickup coil arrangement 110 and the signal of the second single pickup coil 122 (V2), connected up thereto, of the second pickup coil arrangement 120. The third pickup coil pair W delivers a signal that is made up of the signal of the third single pickup coil 113 (W1) of the first pickup coil arrangement 110 and the signal of the third single pickup coil 123 (V2), connected up thereto, of the second pickup coil arrangement 120.

The combination apparatus 130 can be designed to combine the signals of the one or more single pickup coil pairs U, V, W with one another so as, on the basis thereof, to ascertain the angle-error-compensated rotation angle phi' between the stator and the rotor. Here too, these can again be the amplitude-modulated RF signals or the demodulated LF signals, i.e. the angle-error-compensated rotation angle phi' can be ascertained before or after a demodulation.

The signals of the single pickup coils U, V, W are also referred to as pickup coil pair signals herein. The aforementioned combination of the pickup coil pair signals can be an averaging, for example. For example, the combination apparatus 130 can have an individual circuit that is designed to form a mean value from the amplitude-modulated RF signals, or else from the demodulated LF signals. That is to say that the individual circuit of the combination apparatus 130 can, as an alternative or in addition to the previously described averaging of the two angle signals phi1', phi2', form the mean value of the amplitude-modulated RF signals from one pickup coil pair each, or else the mean value of the demodulated LF signals from one pickup coil pair each, and ascertain the angle-error-compensated rotation angle phi' on the basis thereof.

Within certain limits it is unimportant whether the demodulation of the signals takes place before the combination (averaging) of the signals, or whether the combination (averaging) of the RF signals takes place first and then the demodulation of the signals. If angles were linear functions of signals then the same result would be obtained, irrespective of whether the mean value of the angles or the mean value of the signals is formed. Angles are nonlinear functions of signals (on account of the $\arctan_2$ function), however. The averaging of signals in a strictly mathematical sense would therefore not be identical to the averaging of angles. For small angle errors of less than a few degrees, however, all mathematical calculation rules can be linearized for a prescribed rotation position, leading to linearized circumstances. This means that one method described herein, e.g. the averaging of angles (phi1', phi2'), can be replaced by the respective other method described herein, e.g. the averaging of signals (LF signals or RF signals). Nevertheless, in practice, every now and then the two methods can require a different geometric offset angle ρ by which the two pickup coil arrangements 110, 120 are offset from one another.

The previously described interconnection of two single pickup coils 111, 112, 113; 121, 122, 123 to form one single pickup coil pair U, V, W is essentially synonymous with the design of an individual pickup coil arrangement that just has the respective (here: three) single pickup coil pairs U, V, W. An individual circuit can therefore suffice for the averaging in this third exemplary embodiment.

So an individual pickup coil arrangement connected up in this manner can therefore have for example a first single pickup coil pair U that has for example a series connection comprising the two first single pickup coils 111, 121 of the first and second pickup coil arrangements 110, 120. The connected pickup coil arrangement can furthermore have a second single pickup coil pair V that has for example a series connection comprising the two second single pickup coils 112, 122 of the first and second pickup coil arrangements 110, 120. The connected pickup coil arrangement can furthermore have a third single pickup coil pair W that has for example a series connection comprising the two third single pickup coils 113, 123 of the first and second pickup coil arrangements 110, 120. Accordingly, for example the connected single pickup coils U, V, W in the connected pickup coil arrangement are each routed around the axis of rotation R twice (specifically in the same direction, e.g. clockwise), while the respective single pickup coils 111, 112, 113; 121, 122, 123 of each pickup coil pair U, V, W are each routed around the axis of rotation R only once. This third exemplary embodiment has the advantage that the interconnection of the two pickup coil arrangements 110, 120 to form one individual interconnected pickup coil arrangement leads to larger induced signal swings and smaller errors brought about by unavoidable asymmetries on account of connecting wires between the single pickup coils 111, 112, 113; 121, 122, 123 and the combination apparatus 130.

According to a fourth conceivable exemplary embodiment, the single pickup coils 111, 112, 113; 121, 122, 123, as already briefly mentioned at the outset, can each be combined in a parallel connection. That is to say that the first single pickup coil 111 of the first pickup coil arrangement 110 can be connected up in parallel with the first single pickup coil 121 of the second pickup coil arrangement 120. The second single pickup coil 112 of the first pickup coil arrangement 110 can be connected up in parallel with the second single pickup coil 122 of the second pickup coil arrangement 120. And the third single pickup coil 113 of the first pickup coil arrangement 110 can be connected up in parallel with the third single pickup coil 123 of the second pickup coil arrangement 120.

According to a fifth conceivable exemplary embodiment, the single pickup coils 111, 112, 113; 121, 122, 123 can be used separately, i.e. they are not electrically connected up in the sense of a series or parallel connection to form multiple single pickup coil pairs. The single pickup coils are thus not interconnected to form single pickup coil pairs. There would thus be e.g. two pickup coil arrangements 110, 120, arranged in a manner rotated in relation to one another, with three single pickup coils 111, 112, 113, 121, 122, 123 each, which means that there are six single pickup coils present in total, wherein two single pickup coils could be electrically combined in the chip, so that three coil signals (M=3) are subsequently obtained again. The single pickup coils 111, 112, 113; 121, 122, 123 that are not interconnected can each be connected to a dedicated circuit. That is to say that the first single pickup coil 111 of the first pickup coil arrangement 110 can be connected to a first circuit in order to process the output signal (e.g U1) of the first single pickup coil 111 of the first pickup coil arrangement 110. The first single pickup coil 121 of the second pickup coil arrangement 120 can be connected to a different, second circuit in order to process the output signal (e.g U2) of the first single pickup coil 121 of the second pickup coil arrangement 120. The output signals of the two circuits can then be combined with one another in the electronic domain, for example by adding or averaging the respective output voltages or output currents (possibly after a preamplifier stage and/or after a demodulation stage). The circuits can have for example preamplifiers or transconductance stages, for example in the form of an OTA (operational transconductance amplifier), which converts input voltages into output currents. In this fifth exemplary embodiment too, the combination (averaging) of the signals can be performed in the RF domain or in the LF domain, i.e. before or after the demodulation.

That is to say that in this embodiment the angle sensor 100 has a specific number of circuits (here: 6) that corresponds to the number of single pickup coils 111, 112, 113; 121, 122, 123. In this nonlimiting example, there would thus be for example six circuits present for the six single pickup coils 111, 112, 113; 121, 122, 123. The respective output signals (U1, U2; V1, V2; W1, W2) of the single pickup coils can be combined with one another, possibly after an amplification and/or demodulation, i.e. signal U1 is combined with signal U2, signal V1 is combined with signal V2, and signal W1 is combined with signal W2.

So the combination apparatus 130 would accordingly be designed to combine the output signal U1 of the first single pickup coil 111 of the first pickup coil arrangement 110 with the output signal U2 of the first single pickup coil 121 of the second pickup coil arrangement 120, and to combine the output signal V1 of the second single pickup coil 112 of the first pickup coil arrangement 110 with the output signal V2 of the second single pickup coil 122 of the second pickup coil arrangement 120, and to combine the output signal W1 of the third single pickup coil 113 of the first pickup coil arrangement 110 with the output signal W2 of the third single pickup coil 123 of the second pickup coil arrangement 120. Ultimately, three combined coil signals U, V, W are then obtained that can be used to ascertain the angle-error-compensated rotation angle phi: between the stator and the rotor.

Put into more general words, the combination apparatus 130 can have a first and a second circuit in this fifth exemplary embodiment. The first circuit can be connected to a single pickup coil 111 of the first pickup coil arrangement 110 and designed to process the signals (RF or LF signals) of this single pickup coil 111 and to generate a first single coil output signal (e.g. a first output current signal of an OTA). The second circuit can be connected to a single pickup coil 121 of the second pickup coil arrangement 120 and designed to process the signals (RF or LF signals) of this single pickup coil 121 and to generate a second single coil output signal (e.g. a first output current signal of an OTA). The combination apparatus 130 can be designed to combine the respective first and second single coil output signals (RF or LF signals) of each of the pickup coil arrangements 110, 120 with one another (e.g. averaging) so as, on the basis thereof, to ascertain the angle-error-compensated rotation angle phi' between the stator and the rotor.

The aforementioned third exemplary embodiment is advantageous because it needs at least the electronic resources, e.g just one individual chip. In principle, all circuits can certainly always be integrated on one chip. Nevertheless, the system according to the fifth exemplary embodiment discussed above needs far fewer circuits (e.g. fewer amplifiers, fewer pads, less protective circuitry per pad such as e.g. ESD protection, etc.) on the chip than the previous exemplary embodiments. For reasons of redundancy, however, it may be desired to split the circuit over two chips, for example if one breaks then the second continues to operate.

The aforementioned first exemplary embodiment is advantageous because it is very reliable, since it implicitly has redundancy. It has two completely independent pickup coil arrangements 110, 120, which are connected to one dedicated circuit each. The combination (e.g. averaging) of the two rotation angles phi1', phi2' can be performed in a downstream stage (e.g. a microprocessor). This processing circuit (e.g. microprocessor) can moreover compare the two angles phi1' and phi2' with one another. If the difference is much greater than the angle error dphi that is to be expected, the combination apparatus 130 can output an alarm, as one of the pickup coil arrangements 110, 120 or one of the circuits could then be defective.

The aforementioned second exemplary embodiment is a type of hybrid system comprising the first and third exemplary embodiments. Although it likewise has two pickup coil arrangements 110, 120, it has only one individual circuit. This second exemplary embodiment is therefore redundant with regard to the pickup coil arrangements 110, 120, but not with regard to the sensor system or the circuits. Since the two pickup coil arrangements 110, 120 are scanned at different times, this second exemplary embodiment is suitable in particular for low speeds.

It is conceivable that the stator has an individual substrate (e.g. a PCB) that can be used for all of the exemplary embodiments described herein at the same time. This provides a very versatile stator for the inductive angle sensor 100. There can be sufficient space available on a PCB to place both pickup coil arrangements 110, 120 thereon without difficulty. As was already described herein by way of illustration, the single pickup coils 111, 112, 113; 121, 122, 123 of one pickup coil arrangement 110, 120 can be offset by the offset angle $\alpha=360°/k/M=20°$ relative to one another in the case of a pickup coil arrangement having three single pickup coils (M=3) and 6-fold symmetry (k=6). Accordingly, the radial segments of the respective single pickup coils 111, 112, 113; 121, 122, 123 of the respective pickup coil arrangement 110, 120 in an individual metallization layer would be spaced apart by 20° each. Therefore, for example the entire first pickup coil arrangement 110 can be rotated in relation to the second pickup coil arrangement 120 such that the radial segments of the single pickup coils 111, 112, 113 of the first pickup coil arrangement 110 are each arranged in the middle between the radial segments of the single pickup coils 121, 122, 123 of the second pickup coil arrangement 120, i.e. the geometric offset angle between the two pickup coil arrangements 110, 120 would in this case be $\rho=\alpha*n/4=360°/k/M*n/4$, where n=2, i.e. $\rho=\alpha/2=10°$. The factor n=2 applies in particular in cases in which two angles are first calculated from the induced output signals of the single pickup coils 111, 112, 113; 121, 122, 123 and these angles are then combined.

In cases in which the induced output signals of the single pickup coils 111, 112, 113; 121, 122, 123 are combined with one another and the angle is calculated only thereafter, the factor n=3 can be used. The offset angle in this example (k=6; M=3) would then be $\rho=15°$.

In general, it is entirely possible for the two pickup coil arrangements 110, 120 to be rotated through a geometric offset angle $\rho=\alpha*n/4$, where n is a whole number (integer) greater than 1. That is to say that the variable it can also have values other than the n=2 or n=3 described herein merely be way of illustration.

For example, the variable n can have a value between n=1 and n=10, or between n=1 and n=5, or between n=1 and n=3. For example, the variable n can have a value so that an angle $\rho$ (rho) is obtained for which the radial segments of the single pickup coils 111, 112, 113 of the first pickup coil arrangement 110 are each arranged between the radial segments of the single pickup coils 121, 122, 123 of the second pickup coil arrangement 120.

The nonlimiting exemplary embodiments described hitherto have essentially concerned pickup coil arrangements 110, 120 having an uneven number of single pickup coils 111, 112, 113, 121, 122, 123 (M=3) and 6-fold symmetry (k=6) and having non-astatic single pickup coils, wherein the pickup coil arrangements 110, 120 can be rotated for example through $\rho=10°$ in relation to one another. The angle-error-compensated rotation angle phi can be ascertained by using the individual angle signals phi1', phi2' of the respective pickup coil arrangement 110, 120, with for example an averaging of the two angle signals phi1', phi2' being able to be effected.

The design described herein, and everything that has been described herein regarding non-astatic single pickup coils, can also be used for astatic pickup coil arrangements having two single pickup coils (COS coil, SIN coil) each, however.

Figure 2A:
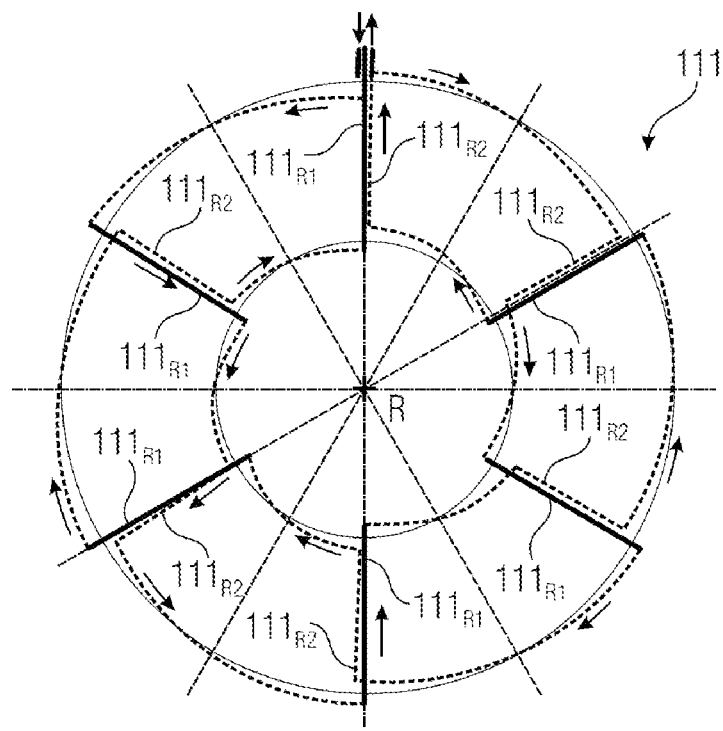
FIG. 2A shows a schematic plan view of a model of an astatic single pickup coil according to an exemplary embodiment.
Figure 2B:
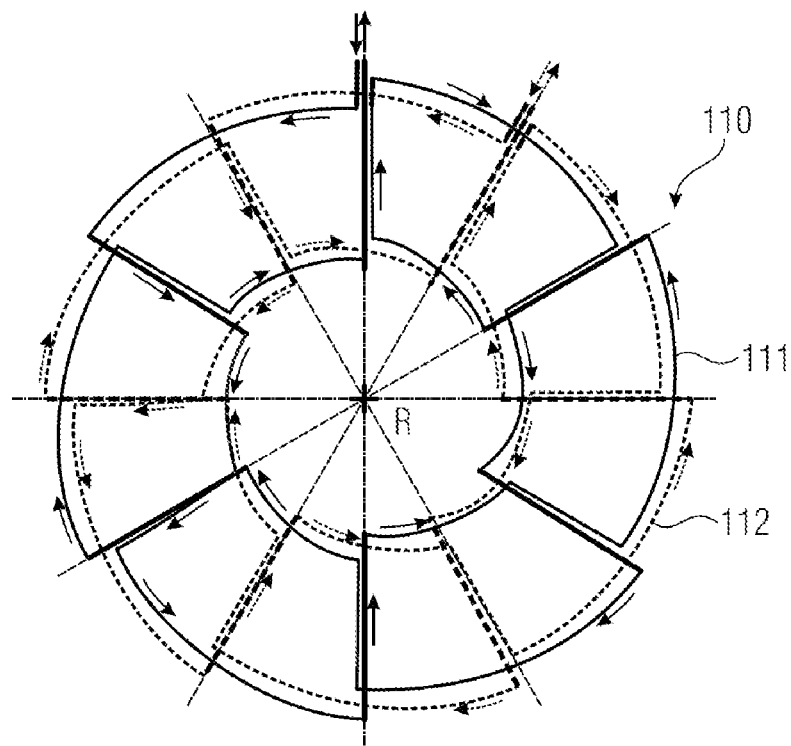
FIG. 2B shows a schematic plan view of a model of two astatic single pickup coils arranged in a manner offset from one another, according to an exemplary embodiment.

FIG. 2A shows a schematic view of an individual cosine coil or a single pickup coil 111. FIG. 2B shows an astatic pickup coil arrangement 110 having a first single pickup coil (COS coil) 111 and a second single pickup coil (SIN coil) 112 rotated in relation thereto by the offset angle $\alpha$.

FIGS. 2A and 2B show an example of a pickup coil arrangement having two single pickup coils 111, 112 (M=2), which belong to a target with 3-fold symmetry (k=3), i.e. the depicted single pickup coils 111, 112 each have a 3-fold symmetry, i.e. k=3. As has already been described herein, two adjacent turns of a single pickup coil 111, 112 each have a winding direction in an opposite sense (see the arrows shown) in order to provide a coil system that is robust in the face of stray fields (i.e. astatic). The single pickup coils 111, 112 depicted here are thus astatic single pickup coils. The signals of the two single pickup coils 111, 112 have a 90° phase offset in relation to one another here.

In FIG. 2A the radial segments $111_{R1}$ (blue) are produced in a first metallization plane or metallization layer, and the radial segments $111_{R2}$ (orange) are produced in a different, second metallization plane or metallization layer. The two metallization layers are connected to one another by means of plated-through holes (vias). The single pickup coil 111 has six turns that are arranged in an annular arrangement around the axis of rotation R. The winding direction of each second turn changes, i.e. two adjacent turns have winding directions in opposite senses (see arrows). As such, the arrows point clockwise in a first turn and counterclockwise in an adjacent second turn, then clockwise again for the next adjacent third turn, counterclockwise again in the next adjacent fourth turn, and so on.

FIG. 2A shows a complete astatic pickup coil arrangement 110 having the previously described first single pickup coil 111 (e.g. COS coil) and an additional, second single pickup coil 112 (e.g. SIN coil). The first single pickup coil 111 is shown in solid lines, and the second single pickup coil 112 is shown in dashed lines. Here too the turns of the respective single pickup coils 111, 112 alternate, as explained previously with reference to FIG. 2A, between two metallization layers.

The first single pickup coil 111 (COS coil) can be identical to the second single pickup coil 112 (SIN coil). The two single pickup coils 111, 112 can be rotated through a geometric offset angle α=360°/k/M/2 (this formula applies to all pickup coil arrangements having an even number of single pickup coils) in relation to one another around the axis of rotation R. In this example (M=2, k=3) it is thus possible for the two single pickup coils 111, 112 to be rotated for example through α=360°/3/2/2=30° in relation to one another.

According to the innovative design described herein, there can now be provision for a second astatic pickup coil arrangement 120. For the sake of clarity, this is not depicted explicitly here. This second astatic pickup coil arrangement 120 can be substantially identical to the pickup coil arrangement 110 described previously with reference to FIG. 2A. That is to say that the second pickup coil arrangement 120 can also have a first astatic single pickup coil 121 and a second astatic single pickup coil 122 rotated through the offset angle α=360°/k/M/2 in relation thereto. These single pickup coils 121, 122 can also likewise be referred to as cosine coil and sine coil based on their signal shape.

For the sake of better distinguishability, the single pickup coils 111, 112 of the first pickup coil arrangement 110 are also referred to as COS1 coil and SIN1 coil, whereas the single pickup coils 121, 122 of the additional, second pickup coil arrangement 120 are also referred to as COS2 coil and SIN2 coil.

The two pickup coil arrangements 110, 120 can be rotated through a geometric offset angle ρ (rho) in relation to one another. The offset angle ρ can be for example ρ=α*n/4, or ρ=360°/k/M/2*n/4, wherein in this example (k=3; M=2) n=2 would be possible if the signal combination involves a single rotation angle signal phi1', phi2' specific to the respective pickup coil arrangement 110, 120 first being ascertained for each of the output signals induced in the pickup coil arrangements 110, 120 and then these single rotation angle signals phi1', phi2' being combined with one another. If, however, the signal combination involves the output signals induced in each of the pickup coil arrangements 110, 120 being combined with one another first and, based on this combination of the induced output signals, the angle-error-compensated rotation angle phi' between the stator and the rotor then being ascertained, then n=3 would be possible. In the former case (i.e. combination of angle signals and n=2) the offset angle ρ between the two pickup coil arrangements 110, 120 would be ρ=15°, i.e. the first pickup coil arrangement 110 would be rotated through 15° in relation to the second pickup coil arrangement 120. In the latter case (i.e. combination of the induced output signals and n=3) the offset angle would be ρ=22.5°, for example, i.e. the first pickup coil arrangement 110 would be rotated through 22.5° in relation to the second pickup coil arrangement 120.

In the case of an astatic pickup coil system of this kind too, the combination apparatus 130 can be designed to combine the signals of the first pickup coil arrangement 110 and the signals of the second pickup coil arrangement 120 with one another (e.g. averaging) so as, on the basis thereof, to ascertain the angle-error-compensated rotation angle phi. The signals can be the aforementioned angle signals phi1', phi2' or the amplitude-modulated RF signals or the demodulated LF signals as alternatives.

The astatic pickup coil system can likewise be produced in one of the aforementioned five different embodiments. In particular, the single pickup coils 111, 112; 121, 122 can be interconnected to form pickup coil pairs COS, SIN, for example in the form of a series or parallel connection. For example, the SIN1 coil and the SIN2 coil can be interconnected to form a first pickup coil pair SIN, and the COS1 coil and the COS2 coil can be interconnected to form a second pickup coil pair COS.

To verify the innovative design described herein, mathematical models were developed, which will be explained in more detail below with reference to FIGS. 3A to 6C. These are intended to clarify how the geometric offset angle ρ (rho) of the two (identical) pickup coil arrangements 110, 120 can be determined in order to ensure the best possible accuracy when determining the rotation angle phi between the rotor and the stator, i.e. to allow the best possible compensation for the angle error band (see FIG. 14).

It will first of all be mentioned for the sake of clarity that the offset angle ρ (rho) can be derived for example from the periodicity of a systematic angle error curve of a conventional angle sensor system (in that case e.g. rho would be the angular distance between maxima and minima). Alternatively, the angle ρ (rho) can be ascertained by calculating or measuring the resultant systematic angle error (analogously to the depiction in FIG. 3A).

For this purpose, an inductive angle sensor 100 will be assumed below that has two non-astatic pickup coil arrangements 110, 120 with three single pickup coils 111, 112, 113; 121, 122, 123 or U1, V1, W1; U2, V2, W2 each (i.e. M=3) and an associated target, the pickup coil arrangements 110, 120 and the target each having a 6-fold symmetry (i.e. k=6). The single pickup coils U1, V1, W1 of the first pickup coil arrangement 110 can be connected to one associated single pickup coil U2, V2, W2 each of the second pickup coil arrangement 120, either in a series or parallel connection, together to form one pickup coil pair U, V, W each, in the manner described above (see the third exemplary embodiment discussed previously). The signals of the respective single pickup coils interconnected to form a pickup coil pair are therefore added to form a joint coil pair signal. Alternatively, the signals of the single pickup coils can be combined electronically (see the fifth exemplary embodiment discussed above).

FIG. 1A already showed such a coil system with M=3, which, for the sake of clarity, exhibits only one individual pickup coil arrangement 110, however. The depicted single pickup coils 111 (U1), 112 (V1), 113 (W1) are depicted purely schematically as closed turns here. In reality, the single pickup coils 111, 112, 113 are open at one point, however, in order to provide electrical connections at which the signals can be tapped off. The field coil is not depicted here. It would be arranged annularly around the pickup coil arrangement 110 and in the same metallization plane as the pickup coil arrangement 110.

According to the innovative design described herein, a substantially identical second pickup coil arrangement 120 (see FIGS. 1B, 1C) can now be provided. This second pickup coil arrangement 120 can likewise have three single pickup coils 121 (U2), 122 (V2), 123 (W2) (M=3) and be arranged in a manner rotated around the axis of rotation R through the geometric offset angle ρ (rho) in relation to the first pickup coil arrangement 110. According to the formula described herein, the offset angle ρ in this example (k=6; M=3; n=3) can be calculated as $\rho=\alpha*n/4=360°/k/M*n/4=360°/6/3*3/4=15°$. In the model calculation discussed here, the offset angle ρ was varied between 2° and 18°.

The signals induced in the single pickup coils U1, V1, W1; U2, V2, W2 are extracted and combined, for example by using an averaging. For the model calculation, the amplitude-modulated RF signals are first (mathematically) demodulated and then the LF signals are added up (U1+U2; V1+V2; W1+W2). The angle signals phi1', phi2' and the angle error band are then calculated for all rotation positions between the rotor and the stator. Finally, the maximum angle errors over a full revolution are taken and plotted against the offset angle (angular shift) of the two pickup coil arrangements 110, 120. A corresponding plot is shown in FIGS. 3A and 3B.

Figure 3A:
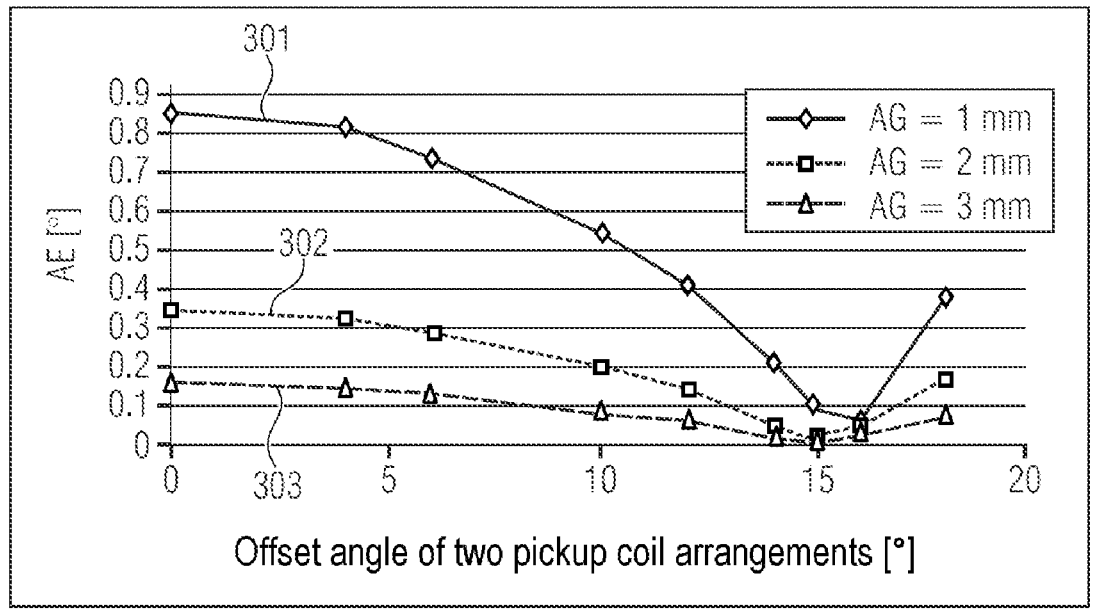
FIG. 3A shows a plot to represent the maximum angle error as a function of the offset angle ρ (rho) between two pickup coil arrangements.

FIG. 3A shows three different curves, for three different air gaps each. The curve 301 was calculated for an air gap of 1 mm, curve 302 was calculated for an air gap of 2 mm and curve 303 was calculated for an air gap of 3 mm. It can be seen that the maximum angle error AE increases drastically for a small air gap. It can additionally be seen that the maximum angle error AE becomes very small for a geometric offset angle ρ (rho) of approximately 15°, irrespective of the air gap. One reason for this is that the angle error can be spectrally broken down and the innovative design described herein eliminates the 3rd harmonic. What is surprising here is that the higher harmonics are obviously much smaller and therefore the residual error diminishes drastically.

It is therefore possible to ascertain the optimum geometric offset angle ρ (rho) between the first pickup coil arrangement 110 and the (identical) second pickup coil arrangement 120 in order to achieve the smallest possible systematic angle error. This optimum geometric offset angle ρ (rho) is furthermore independent of the rotor or target, which is a very great advantage of this design. That is to say that the innovative design described herein works for almost all types and shapes of rotors or targets with, for example 6-fold symmetry (k=6).

Figure 3B:
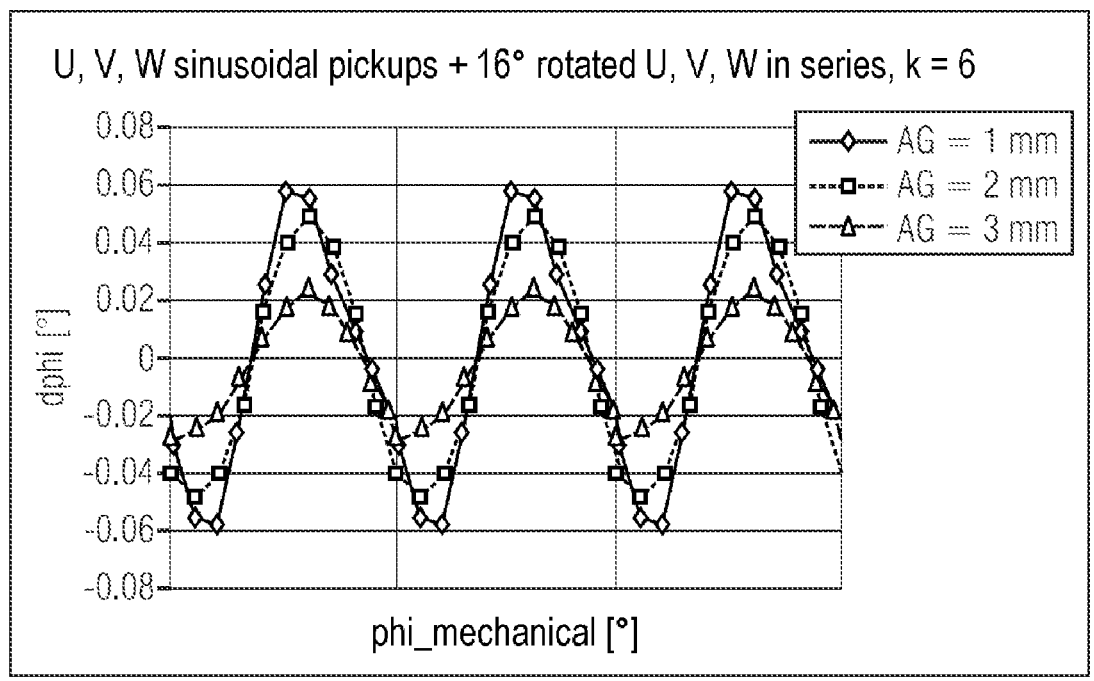
FIG. 3B shows a plot to represent the compensation for the systematic angle error according to the design described herein.

FIG. 3B shows the result of the angle error compensation according to the innovative design described herein. It can be seen that with an air gap of 3 mm the systematic angle error band of originally ±0.2° (see FIG. 14) was reduced to ±0.02°. This corresponds to a reduction in the angle error by a factor of 10.

It should additionally be mentioned that in the plot shown in FIG. 3B the pickup coil arrangements 110, 120 were modelled in a manner offset by ρ=16° from one another, i.e. the modelled offset angle ρ differed by 1° from the calculated (optimum) offset angle of ρ=15° (see above). As can be seen, the angle sensor 100 delivered very good and reproducible results despite this divergence in the angle offset p.

In this example the original pickup coil arrangements had a periodicity of 360°/6=60°, that is to say that a "tooth" of the pickup coil has a magnitude of 30° and a "gap" of the pickup coil likewise has a magnitude of 30°. The optimization result shown here means that the (identical) second pickup coil arrangement needs to be rotated through half a tooth (30°/2=15°) in order to compensate for the systematic angle error in the best possible way.

Figure 4:
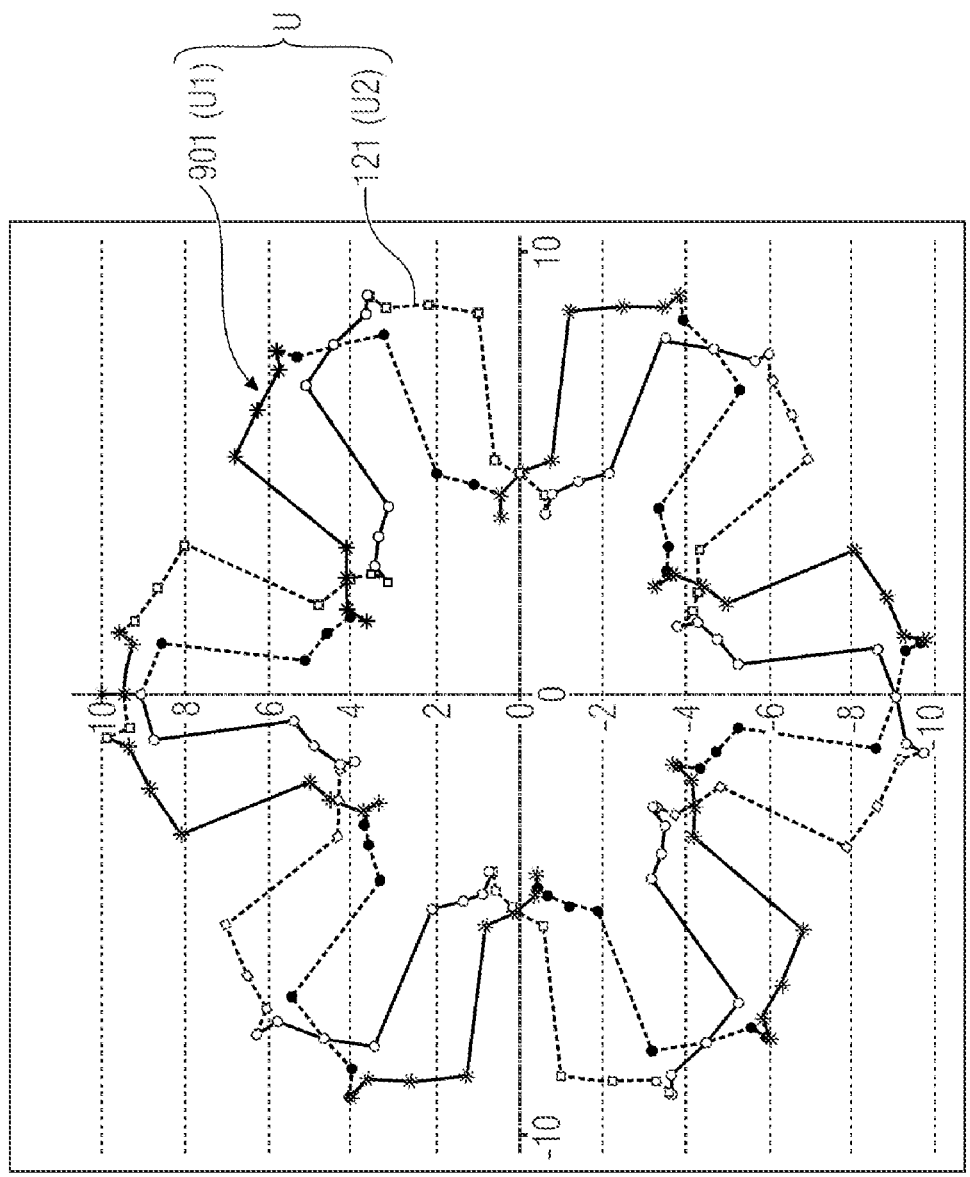
FIG. 4 shows a schematic plan view of a model of two non-astatic single pickup coils that are arranged in a manner offset from one another and electrically interconnected, according to an exemplary embodiment.

If these insights are now applied to the single pickup coil 901 (U1) shown in FIG. 11, for example, then this means that an (identical) second single pickup coil 121 (U2) of an (identical) second pickup coil arrangement 120 can be added that is rotated through 15° in relation to the single pickup coil 901 (U1) shown. FIG. 4 shows a schematic view of such an arrangement. Furthermore, it can be seen that the two single pickup coils 901 (U1), 121 (U2) are connected in series (cf. the third exemplary embodiment discussed above). Essentially a single combined or interconnected single pickup coil U (with U=U1+U2) is therefore obtained.

As can be seen in the top image in FIG. 4, the coil geometry there is slightly altered in order to be able to interconnect the two single pickup coils 901 (U1), 121 (U2). The effect of interconnecting the single pickup coils 901 (U1), 121 (U2) will be explained briefly below with reference to FIG. 5.

Figure 5:
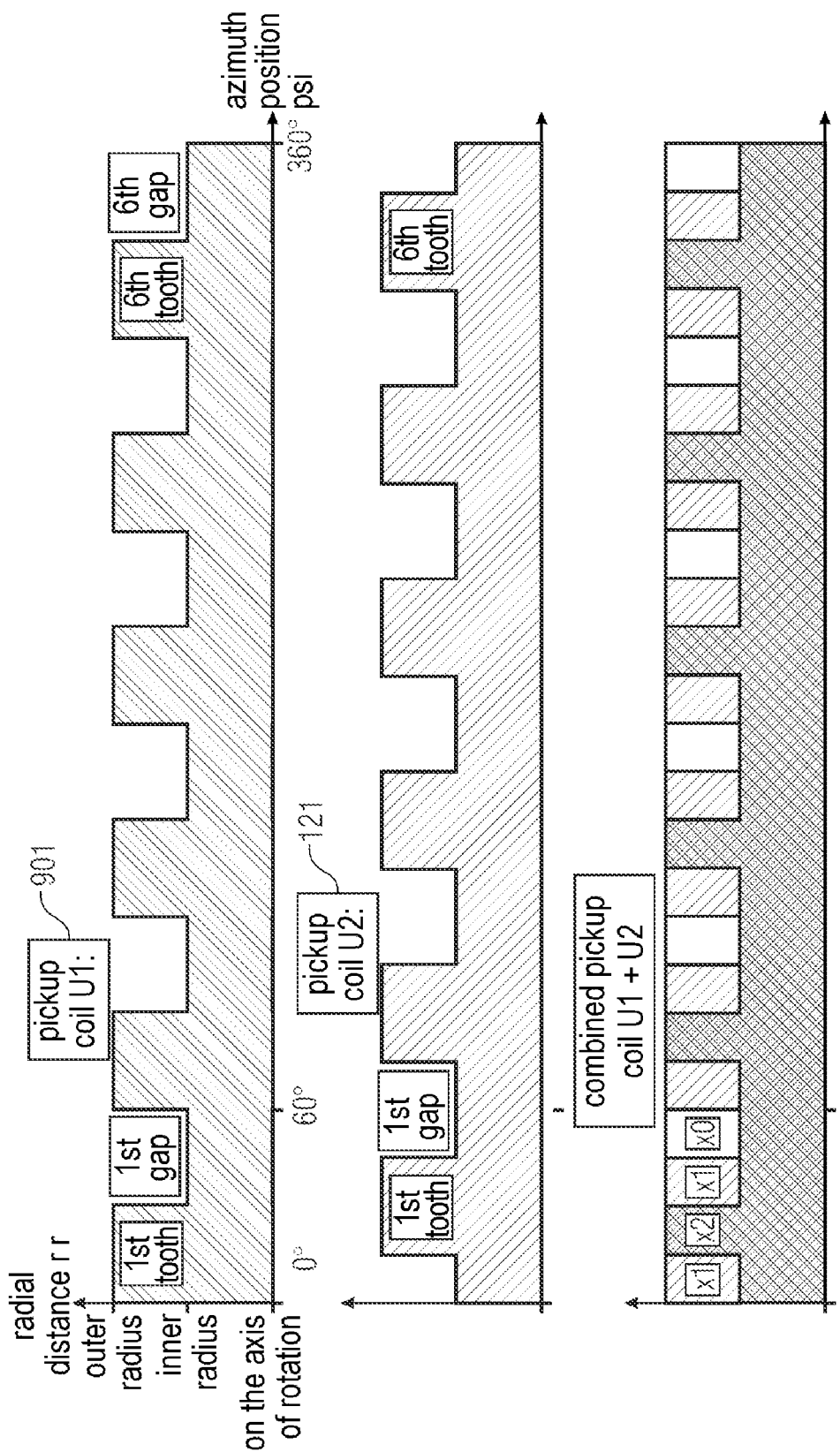
FIG. 5 shows a representation to illustrate the degree of coverage of individual single pickup coils in an unconnected and an interconnected arrangement.

FIG. 5 shows a schematic view of the two single pickup coils 901 (U1), 121 (U2) with the turns thereof in an unwound depiction. The unwound turns can be shown in the (psi, r) plane, wherein the azimuth position is plotted on the abscissa and the radial position on the ordinate. The top image depicts the first single pickup coil 901 (U1). The second single pickup coil 121 (U2) is depicted in the middle. It can be seen that the individual turns of the respective single pickup coils 901 (U1), 121 (U2) are offset from one another by 30° each and that the two single pickup coils 901 (U1), 121 (U2) are offset by 15° relative to one another.

Each of the two single pickup coils 901 (U1), 121 (U2) collects the magnetic flux under the respective function (depicted in light gray) (6 teeth, 6 gaps). As was mentioned at the outset, the second single pickup coil 121 (U2) is offset by 15° in relation to the first single pickup coil 901 (U1) in the azimuth direction (psi direction). If the magnetic flux of the second single pickup coil 121 (U2) is added to the magnetic flux of the first single pickup coil 901 (U1), overlapping regions are obtained in which the magnetic flux doubles. This is depicted in the lower image in FIG. 5. The overlapping (dark gray) zones are denoted by 'x2', in order to identify the doubled magnetic flux. This depiction shown in FIG. 5 reveals that the combination of the two single pickup coils 901 (U1), 121 (U2) shows the weighting with which the magnetic flux is collected to be approximately sinusoidal.

Figure 6A:
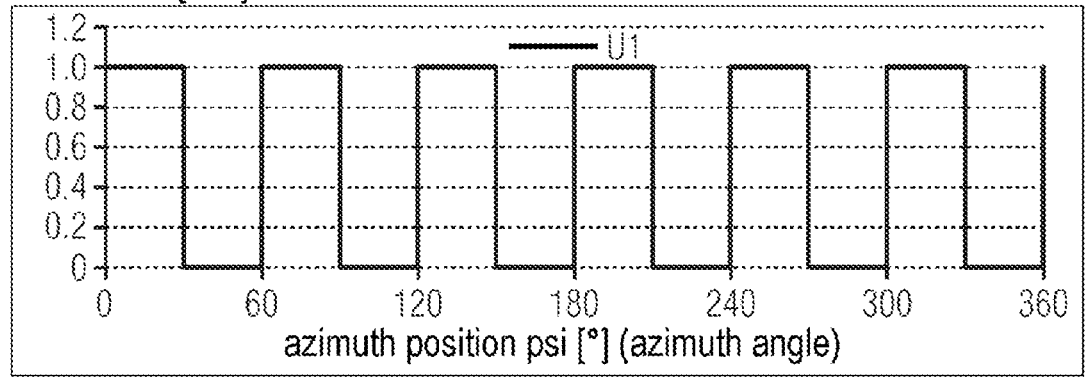
FIGS. 6A-6C show a further representation to illustrate the approximated sinusoidal degree of coverage of the pickup coil surfaces.
Figure 6B:
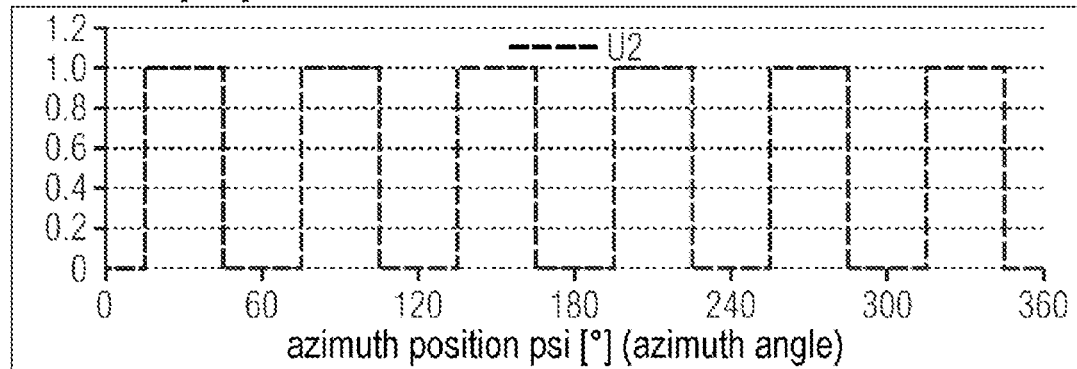
Figure 6C:
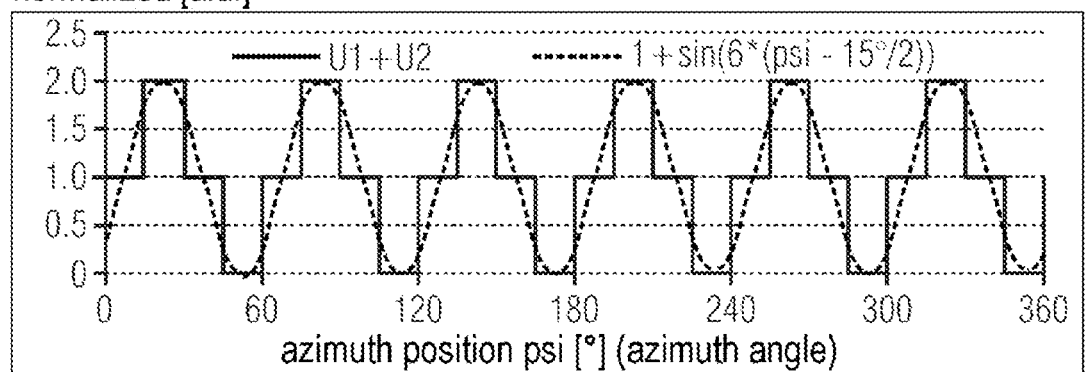

FIGS. 6A, 6B and 6C show a sinusoidal curve profile of this kind. FIG. 6A shows the flux density of the first single pickup coil 901 (U1), FIG. 6B shows the flux density of the second single pickup coil 121 (U2) and FIG. 6C shows the result of the overlap of the two single pickup coils 901 (U1), 121 (U2).

The exemplary embodiments described above are merely an illustration of the principles of the innovative design described herein. It goes without saying that modifications and variations of the arrangements and details described herein will be apparent to other persons skilled in the art. The intention is therefore that the design described herein be limited only by the scope of protection of the patent claims that follow and not by the specific details that were presented herein based on the description and the explanation of the exemplary embodiments.

Although a good many aspects have been described in relation to an apparatus, it goes without saying that these aspects are also a description of the corresponding method, which means that a block or a component of an apparatus should also be understood to mean a corresponding method step or a feature of a method step. Analogously, aspects described in relation to or as a method step are also a description of a corresponding block or detail of feature of a corresponding apparatus.

What is claimed is:

1. An inductive angle sensor, comprising:
a stator;
a rotor that is rotatable relative to the stator about an axis of rotation R, wherein the rotor has an inductive target arrangement with k-fold symmetry, and wherein the stator has a first pickup coil arrangement with k-fold symmetry and a second pickup coil arrangement with k-fold symmetry,
wherein the first pickup coil arrangement and the second pickup coil arrangement are each arranged around the axis of rotation and each have the same number of single pickup coils,
wherein the single pickup coils of the first pickup coil arrangement are rotationally offset about the axis of rotation by a geometric offset angle α relative to one another, and wherein the single pickup coils of the second pickup coil arrangement are rotationally offset about the axis of rotation by the same geometric offset angle α relative to one another,
wherein the geometric offset angle α for the first and the second pickup coil arrangements having an even number of single pickup coils is calculated as:

α=360°/k/M/2, and wherein the geometric offset angle α for the first and the second pickup coil arrangements having an uneven number of single pickup coils is calculated as:

α=360°/k/M, where M denotes the number of single pickup coils present per pickup coil arrangement of the first pickup coil arrangement and the second pickup coil arrangement,
a combination circuit configured to perform a signal combination, wherein signals of the first pickup coil arrangement are combined with signals of the second pickup coil arrangement so as, on a basis of the signal combination, to ascertain an angle-error-compensated rotation angle between the stator and the rotor, and
wherein an entire first pickup coil arrangement is rotationally offset about the axis of rotation by a geometric offset angle ρ relative to an entire second pickup coil arrangement.

2. The inductive angle sensor as claimed in claim 1, wherein the geometric offset angle ρ≤the geometric offset angle α.

3. The inductive angle sensor as claimed in claim 1, wherein the geometric offset angle ρ=α*n/4, where n is a whole number greater than 1.

4. The inductive angle sensor as claimed in claim 3, where n=3 if the signal combination involves the signals induced in each of the first and the second pickup coil arrangements first being combined with one another and, on a basis of the signal combination involving the induced signals, the angle-error-compensated rotation angle between the stator and the rotor then being ascertained, or
where n=2 if the signal combination involves a single rotation angle signal specific to a respective pickup coil arrangement first being ascertained for each of the output signals induced in the first and the second pickup coil arrangements and then the single rotation angle signals being combined with one another so as, on a basis of this combination of the single rotation angle signals, to ascertain the angle-error-compensated rotation angle between the stator and the rotor.

5. The inductive angle sensor as claimed in claim 1, wherein the combination circuit is configured to ascertain the angle-error-compensated rotation angle between the stator and the rotor based on an averaging of the signals of the first pickup coil arrangement and output signals of the second pickup coil arrangement offset by the geometric offset angle ρ.

6. The inductive angle sensor as claimed in claim 1, wherein the signals of the first and the second pickup coil arrangements are each amplitude-modulated radio-frequency output signals of the respective first or second pickup coil arrangement, wherein the amplitude of the carrier frequency of a respective radio-frequency output signal varies based on a position between the stator and the rotor, or
wherein the signals of the first and the second pickup coil arrangements are demodulated signals from amplitude-modulated radio-frequency output signals of the respective pickup coil arrangement, wherein each demodulated signal is indicative of an envelope of one of the amplitude-modulated radio-frequency output signals.

7. The inductive angle sensor as claimed claim 1, wherein the combination circuit is configured to take the signals of the first pickup coil arrangement as a basis for ascertaining a first angle signal that represents a position of the target arrangement in relation to the first pickup coil arrangement, and
to take the signals of the second pickup coil arrangement as a basis for ascertaining a second angle signal that represents a position of the target arrangement in relation to the second pickup coil arrangement, and
to take an averaging of the first and the second angle signals as a basis for generating a combined angle signal that describes the angle-error-compensated rotation angle between the stator and the rotor.

8. The inductive angle sensor as claimed in claim 7, wherein the combination circuit includes a first circuit, a second circuit, and a third circuit,
wherein the first circuit is connected to the first pickup coil arrangement and configured to calculate the first angle signal, wherein the second circuit is connected to the second pickup coil arrangement and configured to calculate the second angle signal, and wherein the third circuit is configured to combine the first and the second angle signals with one another so as, on the basis thereof, to ascertain the angle-error-compensated rotation angle between the stator and the rotor.

9. The inductive angle sensor as claimed in claim 7, wherein the combination circuit includes a circuit that is configured to determine the first and the second angle signals by using a time-division multiplexing method, wherein at least one signal component of the first angle signal is calculated in a first time interval based on the signals of the first pickup coil arrangement, and wherein at least one signal component of the second angle signal is calculated in a different, second time interval based on the signals of the second pickup coil arrangement.

10. The inductive angle sensor as claimed in claim 1, wherein the first and the second pickup coil arrangements are electrically coupled to one another and form one or more single pickup coil pairs, wherein, in each single pickup coil pair, a respective one of the single pickup coils of the first pickup coil arrangement is interconnected with a respective single pickup coil, which is offset therefrom by the geometric offset angle $\rho$, of the second pickup coil arrangement in a series connection or parallel connection, and wherein the combination circuit is configured to take a combination of the signals of the respectively interconnected single pickup coils of the one or more single pickup coil pairs as a basis for ascertaining the angle-error-compensated rotation angle between the stator and the rotor.

11. The inductive angle sensor as claimed in claim 10, wherein, based on the electrical coupling, one signal of a first single pickup coil of a single pickup coil pair is combined with one signal of the second single pickup coil, interconnected therewith, of the same single pickup coil pair to form one joint coil pair output signal each, and wherein the combination circuit includes a circuit that is configured to combine the respective coil pair output signals of the one or more single pickup coil pairs with one another so as, on the basis thereof, to ascertain the angle-error-compensated rotation angle between the stator and the rotor.

12. The inductive angle sensor as claimed in claim 10, wherein the combination circuit is configured to ascertain the angle-error-compensated rotation angle between the stator and the rotor based on an averaging of the signals of the respective interconnected single pickup coils of the one or more single pickup coil pairs.

13. The inductive angle sensor as claimed in claim 1, wherein the combination circuit includes a first circuit and a second circuit, wherein the first circuit is connected to a first single pickup coil of the first pickup coil arrangement and is configured to process the signals of the first single pickup coil and to ascertain a first single coil output signal, and wherein the second circuit is connected to a second single pickup coil of the second pickup coil arrangement and is configured to process the signals of the second single pickup coil and to ascertain a second single coil output signal, and wherein the combination circuit is configured to combine the respective first and the second single coil output signals with one another to generate a signal combination so as, on a basis of the signal combination, to ascertain the angle-error-compensated rotation angle between the stator and the rotor.

14. The inductive angle sensor as claimed claim 1, wherein the stator includes a substrate on which both the first pickup coil arrangement and the second pickup coil arrangement are arranged jointly.

15. The inductive angle sensor as claimed in claim 14, wherein the substrate has at least two metallization layers that are at a distance from one another, wherein the single pickup coils of the first pickup coil arrangement are alternately produced in the metallization layers of the substrate, and wherein the single pickup coils of the second pickup coil arrangement are alternately produced in the metallization layers of the substrate, and are offset by the geometric offset angle $\rho$ in relation to the single pickup coils of the first pickup coil arrangement.

* * * * *